US012688525B2

(12) United States Patent 
Reed et al.

(10) Patent No.: US 12,688,525 B2 
(45) Date of Patent: Jul. 21, 2026

(54) SYSTEM AND METHOD FOR QUICK TRANSACTIONS

(71) Applicant: PAYPAL, INC., San Jose, CA (US)

(72) Inventors: Harper Reed, Chicago, IL (US); Dylan Richard, Chicago, IL (US); Gauri Sharma, Chicago, IL (US)

(73) Assignee: PAYPAL, INC., San Jose, CA (US)

( * ) Notice: Subject to any disclaimer, the term of this patent is extended or adjusted under 35 U.S.C. 154(b) by 252 days.

(21) Appl. No.: 18/052,031

(22) Filed: Nov. 2, 2022

(65) Prior Publication Data

US 2023/0145825 A1 May 11, 2023

Related U.S. Application Data

(63) Continuation of application No. 16/201,945, filed on Nov. 27, 2018, now Pat. No. 11,494,827, which is a (Continued)

(51) Int. Cl. 
*G06Q 30/0601* (2023.01)

(52) U.S. Cl. 
CPC ................................ *G06Q 30/0633* (2013.01)

(58) Field of Classification Search 
CPC ......... G06Q 30/06–0645; G06Q 30/08; G06Q 50/01 
See application file for complete search history.

(56) References Cited

U.S. PATENT DOCUMENTS

| | | | |
|---|---|---|---|
| 5,960,411 | A | 9/1999 | Hartman et al. |
| 6,993,572 | B2 * | 1/2006 | Ross, Jr. ................ G06Q 30/06 |
| | | | 715/255 |

(Continued)

FOREIGN PATENT DOCUMENTS

| | | |
|---|---|---|
| WO | 2015105956 A1 | 7/2015 |
| WO | 2015105959 A1 | 7/2015 |
| WO | 2015105960 A1 | 7/2015 |

OTHER PUBLICATIONS

K. Kuramitsu and K. Sakamura, "Openbasket: a pick-and-droppable shopping agent placing orders to multiple electronic storefronts," Proceedings 2001 Symposium on Applications and the Internet, 2001, pp. 65-74, doi: 10.1109/SAINT.2001.905169. (Year: 2001).*

(Continued)

*Primary Examiner* — Adam L Levine 
(74) *Attorney, Agent, or Firm* — Haynes and Boone, LLP

(57) ABSTRACT

A system and application for purchasing one or more items via quick online transactions from a vendor system is provided. An electronic shopping page listing products for sale and corresponding buy selectors is provided on a user device that includes the quick transaction system. Upon user selection of a buy selector, the user's log on status and payment information are determined, and, if necessary, the user is prompted to log on to the quick transaction application and/or complete any missing user payment information if necessary. A single click or tap on the buy selector generates a completed purchase transaction without the need for a shopping cart or user checkout process. Methods and machine-readable medium for quick online transactions are also provided.

20 Claims, 19 Drawing Sheets

Related U.S. Application Data continuation of application No. 14/592,206, filed on Jan. 8, 2015, now abandoned.

(60) Provisional application No. 61/925,091, filed on Jan. 8, 2014, provisional application No. 62/082,724, filed on Nov. 21, 2014.

(56) References Cited

U.S. PATENT DOCUMENTS

| | | | |
|---|---|---|---|
| 7,213,755 | B2 | 5/2007 | Newsome et al. |
| 7,363,248 | B2 | 4/2008 | Rollins et al. |
| 7,818,399 | B1 * | 10/2010 | Ross, Jr. ............ G06Q 30/0274 |
| | | | 709/215 |
| 8,140,418 | B1 * | 3/2012 | Casey ................... G06Q 40/02 |
| | | | 709/227 |
| 8,175,935 | B2 | 5/2012 | Dearlove et al. |
| 8,200,530 | B2 * | 6/2012 | Kniaz ................... G06Q 30/00 |
| | | | 705/14.1 |
| 8,468,062 | B1 | 6/2013 | Kamdar |
| 8,577,753 | B1 | 11/2013 | Vincent et al. |
| 8,725,583 | B2 * | 5/2014 | Yankovich ......... G06Q 30/0253 |
| | | | 705/26.1 |
| 9,092,817 | B2 | 7/2015 | Allocca et al. |
| 9,123,069 | B1 | 9/2015 | Haynes et al. |
| 9,589,295 | B2 | 3/2017 | Black |
| 9,792,621 | B2 * | 10/2017 | Yankovich ......... G06Q 30/0641 |
| 2002/0156719 | A1 | 10/2002 | Finebaum et al. |
| 2003/0208442 | A1 * | 11/2003 | Cockrill ................. G06Q 20/24 |
| | | | 705/40 |
| 2003/0225632 | A1 | 12/2003 | Tong et al. |
| 2004/0181493 | A1 | 9/2004 | Cross et al. |
| 2005/0243792 | A1 | 11/2005 | Simon et al. |
| 2007/0078727 | A1 | 4/2007 | Spiegel et al. |
| 2008/0189189 | A1 | 8/2008 | Morgenstern |
| 2009/0157531 | A1 | 6/2009 | Bui |
| 2009/0281927 | A1 * | 11/2009 | Aliabadi ............ G06Q 30/0621 |
| | | | 705/26.1 |
| 2011/0153460 | A1 * | 6/2011 | Watts ................. G06Q 30/0603 |
| | | | 705/26.1 |
| 2011/0307389 | A1 * | 12/2011 | Francia ................ G07G 1/0036 |
| | | | 705/26.8 |
| 2012/0130853 | A1 | 5/2012 | Petri et al. |
| 2012/0191565 | A1 | 7/2012 | Blank et al. |
| 2012/0296759 | A1 | 11/2012 | Shechtman |
| 2013/0030945 | A1 | 1/2013 | Polt |
| 2013/0085807 | A1 | 4/2013 | Cincotta |
| 2013/0085896 | A1 | 4/2013 | Hartman et al. |
| 2013/0173426 | A1 * | 7/2013 | Deutscher ......... G06Q 30/0601 |
| | | | 705/26.41 |
| 2013/0290187 | A1 | 10/2013 | Itwaru |
| 2013/0304576 | A1 | 11/2013 | Berland et al. |
| 2015/0193858 | A1 | 7/2015 | Reed et al. |
| 2015/0193861 | A1 | 7/2015 | Reed et al. |

OTHER PUBLICATIONS

International Appl. No. PCT/US2015/010596, International Search Report and Written Opinion dated May 5, 2015, 8 pages.

International Appl. No. PCT/US2015/010599, International Search Report and Written Opinion dated Apr. 10, 2015, 9 pages.

International Appl. No. PCT/US2015/010601, International Search Report and Written Opinion dated Apr. 16, 2015, 9 pages.

International Preliminary Report on Patentability for Application No. PCT/US2015/010596 mailed on Jul. 21, 2016, 8 pages.

International Preliminary Report on Patentability for Application No. PCT/US2015/010599 mailed on Jul. 21, 2016, 9 pages.

International Preliminary Report on Patentability for Application No. PCT/US2015/010601 mailed on Jul. 21, 2016, 9 pages.

* cited by examiner

| SHOP ID | 203 |
|---|---|
| SHOP NAME | 204 |
| ADMIN | 205 |
| PHYSICAL ADDRESS | 206 |
| ITEM LIST | 210 |

202

| ITEM ID | 252 |
|---|---|
| ITEM TITLE | 253 |
| SHOP ID | 254 |
| TRUE ITEM | 255 |
| TRUE ITEM DESCRIPTION FIELD | 256 |

250

402 — BROWSE CATALOG

404 — PRESS ORDER

406 — GENERATE CONFIRMATION

502 — RECEIVE ORDER MODIFICATION

504 — HAS ORDER BEEN PROCESSED FOR SHIPPING YET?

YES

NO

506 — INFORM SHOPPER THAT SHIPMENT IS ALREADY IN PROCESS

508 — MODIFY ORDER

510 — FORWARD SHOPPER TO RETURN PROCESS

512 — EXIT

RECEIVE RETURN REQUEST — 552

PRINT RETURN LABEL — 554

PRINT RETURN INSTRUCTIONS — 556

CHANGE ORDER STATUS TO "RETURN IN PROCESS" — 558

EXIT — 560

1004              1006              1008

ACTIVE
RFID          μP          802.11
TRANSCEIVER

1002

BATTERY          *Fig. 10b*

MOBILE
DEVICE
MATING
CIRCUIT          μP          ACTIVE
RFID          WIRELESS
TRANCEIVER

1112

*FIG. 19*
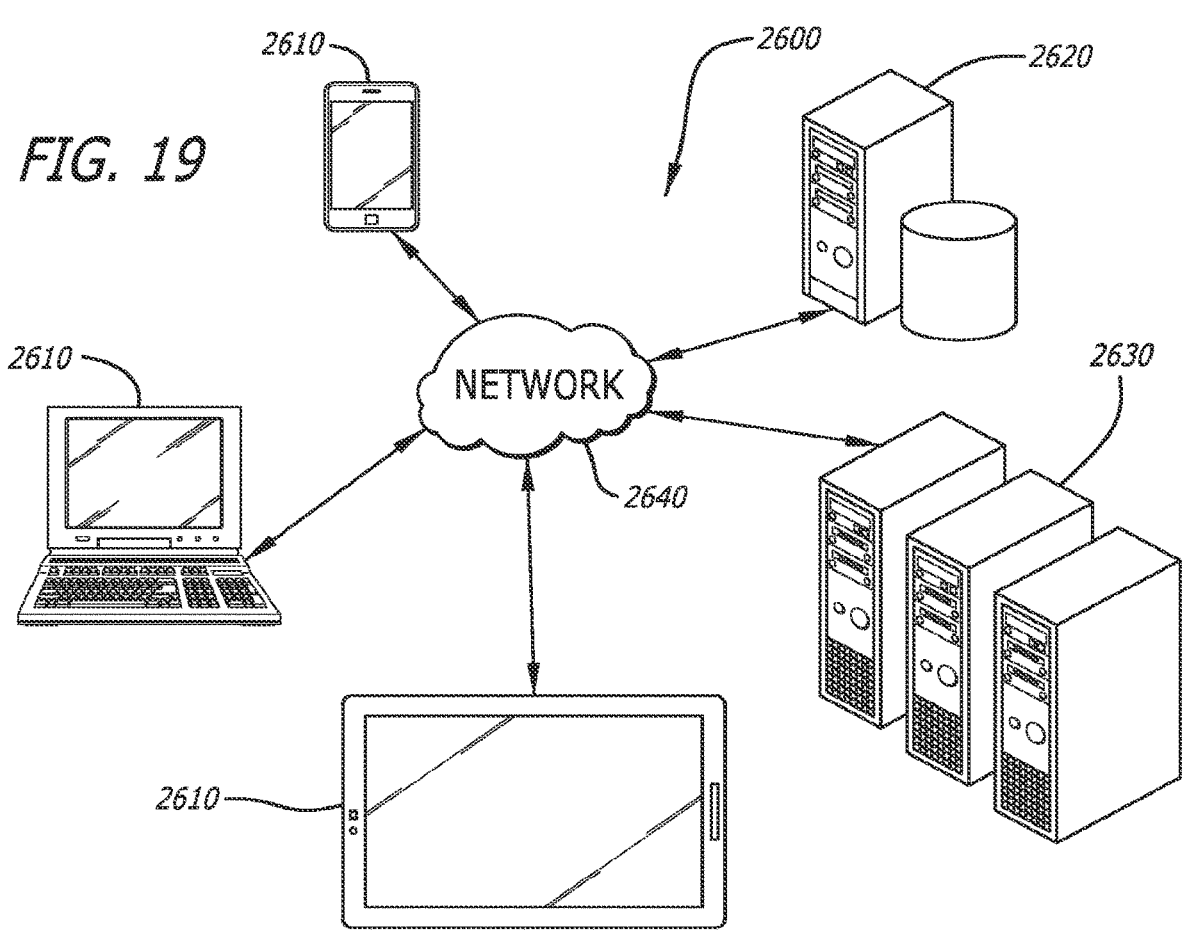
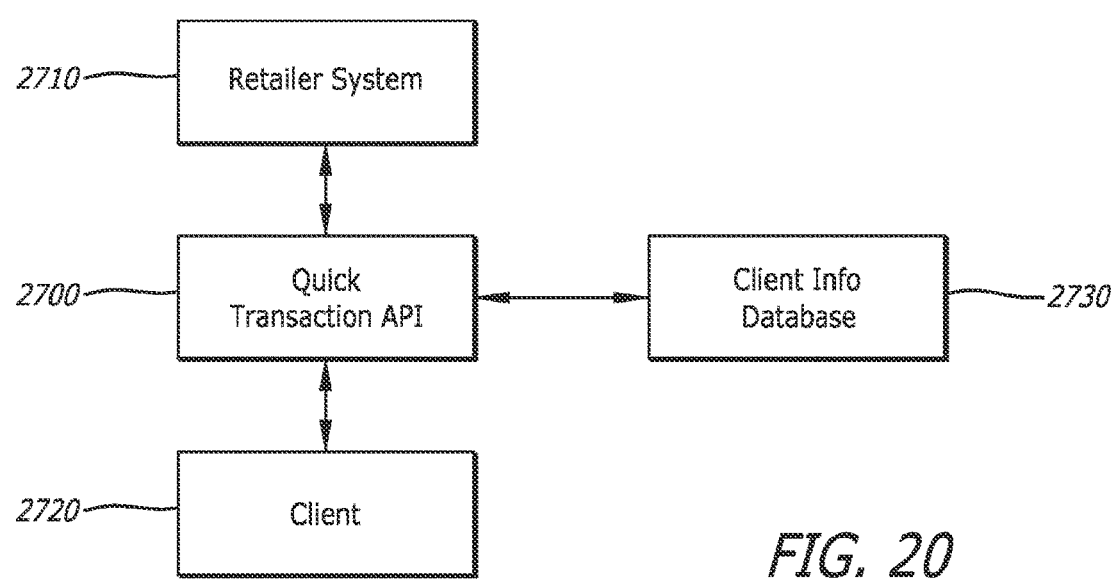
*FIG. 20*

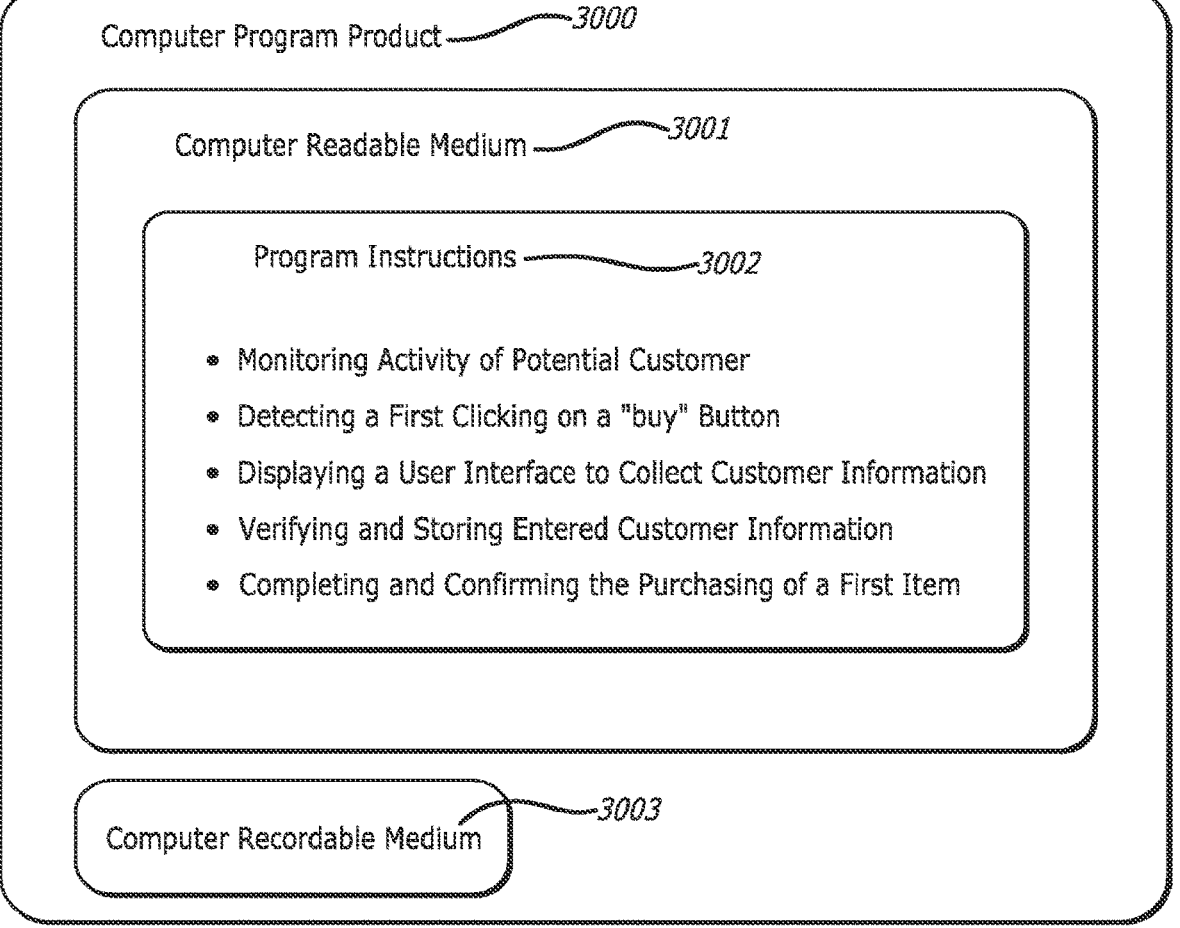

Computer Program Product —— 3000

Computer Readable Medium —— 3001

Program Instructions —— 3002

- Monitoring Activity of Potential Customer
- Detecting a First Clicking on a "buy" Button
- Displaying a User Interface to Collect Customer Information
- Verifying and Storing Entered Customer Information
- Completing and Confirming the Purchasing of a First Item Computer Recordable Medium —— 3003

FIG. 23

SYSTEM AND METHOD FOR QUICK TRANSACTIONS

CROSS-REFERENCE TO RELATED APPLICATIONS

This application is a continuation of U.S. patent application Ser. No. 16/201,945, filed Nov. 27, 2018, which is a continuation of U.S. patent application Ser. No. 14/592,206, filed Jan. 8, 2015, which claims the benefit of U.S. Provisional Patent Application No. 61/925,091, filed Jan. 8, 2014 and U.S. Provisional Patent Application No. 62/082,724, filed Nov. 21, 2014, all of which are expressly incorporated herein by reference and made a part hereof.

TECHNICAL FIELD

The present disclosure generally relates to a method and system for purchasing a plurality of items via quick transactions from a vendor system, and, in particular, to purchasing products on line without the need to add each of the products to a shopping cart in order to initiate purchase flow.

BACKGROUND

Many Web servers and mobile applications have been developed through which vendors can electronically advertise and sell products. The products can include items (e.g., music) that are delivered electronically to the purchaser over the Internet, and items (e.g., clothing) that are delivered through conventional distribution channels (e.g., a common carrier). A server and/or mobile application system may provide on a Web page or application an electronic version of a catalog that lists the items that are available. A user, who is a potential purchaser, may browse through the electronic catalog and select various items that he/she would like to purchase. Typically, the user loads the selected items in a shopping cart, and then once the loading of items is completed, he/she proceeds with their electronic purchase. Sometimes, however, the user may abandon the shopping cart or decide to switch to another vendor server or application for a variety of reasons, including but not limited to a particular desired item not being found or the item being found elsewhere cheaper.

Accordingly, there is need for a system that completes a transaction quicker and/or does not require the user to put products to be purchased in a shopping cart and revisit them before completing the purchase.

SUMMARY

According to one embodiment, the disclosed subject technology relates to a system for providing a quick online transaction. The system includes one or more processors, one or more storage memories, a display and a quick transaction module comprising instructions for causing the one or more processors to execute a method for providing a quick online transaction. The method includes providing, on the display, an electronic page including one or more products for sale by one or more sellers and a buy selector associated with at least one of the displayed products for sale. The method also includes determining, by the one or more processors, if a user is logged in to a quick transaction system when the user selects the buy selector and if the quick transaction system has required user information of the user to complete a purchase transaction when the user selects the buy selector. The method further includes providing, by the one or more processors, for an immediate processing of the purchase transaction if the user is determined to be logged in to the quick transaction system and the required user information is present in the quick transaction system.

The disclosed technology further relates to a non-transitory machine-readable storage medium comprising machine readable instructions for causing a processor to execute a method for providing a quick online transaction. The method includes providing, on the display, an electronic page including one or more products for sale by one or more sellers and a buy selector associated with at least one of the displayed products for sale. The method also includes determining, by the one or more processors, if a user is logged in to a quick transaction system when the user selects the buy selector and if the quick transaction system has required user information of the user to process a purchase transaction when the user selects the buy selector. The method further includes providing, by the one or more processors, for an immediate processing of the purchase transaction if the user is determined to be logged in to the quick transaction system and the required user information is present in the quick transaction system.

The disclosed technology further relates to a computer implemented method for providing a quick online transaction. The method includes providing, on a display of a user device, an electronic page including one or more products for sale by one or more sellers and providing, on the display of the user device, a buy selector associated with at least one of the displayed products for sale. The method also includes determining, by one or more processors, if a user is logged in to a quick transaction application when the user selects the buy selector and providing, on the display of the user device, a first user interface requesting that the user log in to the quick transaction application if it is determined that the user is not logged in to the quick transaction application. The method further includes determining, by the one or more processors, if the quick transaction application has required user information of the user to complete a purchase transaction when the user selects the buy selector and providing, on the display of the user device, a second user interface requesting that the user provide any missing required user information to the quick transaction application if it is determined that the quick transaction application does not have the required user information of the user to complete a purchase transaction. The method also includes providing, by the one or more processors, for an immediate completion of the purchase transaction when the user is determined to be logged in to the quick transaction application and the required user information is present in the quick transaction application.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

FIG. 10b is a simplified schematic diagram of a circuit embedded within the tote bag of FIG. 10a to automatically make retail purchases.

FIG. 11b is a simplified schematic diagram of a circuit embedded within the shopping cart of FIG. 11a to automatically make retail purchases.

FIG. 19 is a block diagram illustrating a client and server system for the quick transaction application.

FIG. 20 is a block diagram illustrating an exemplar quick transaction application in a system.

FIG. 23 is a schematic diagram illustrating a conceptual partial view of an example computer program.

DETAILED DESCRIPTION OF THE DRAWINGS

Figures 1, 2A, 2B:
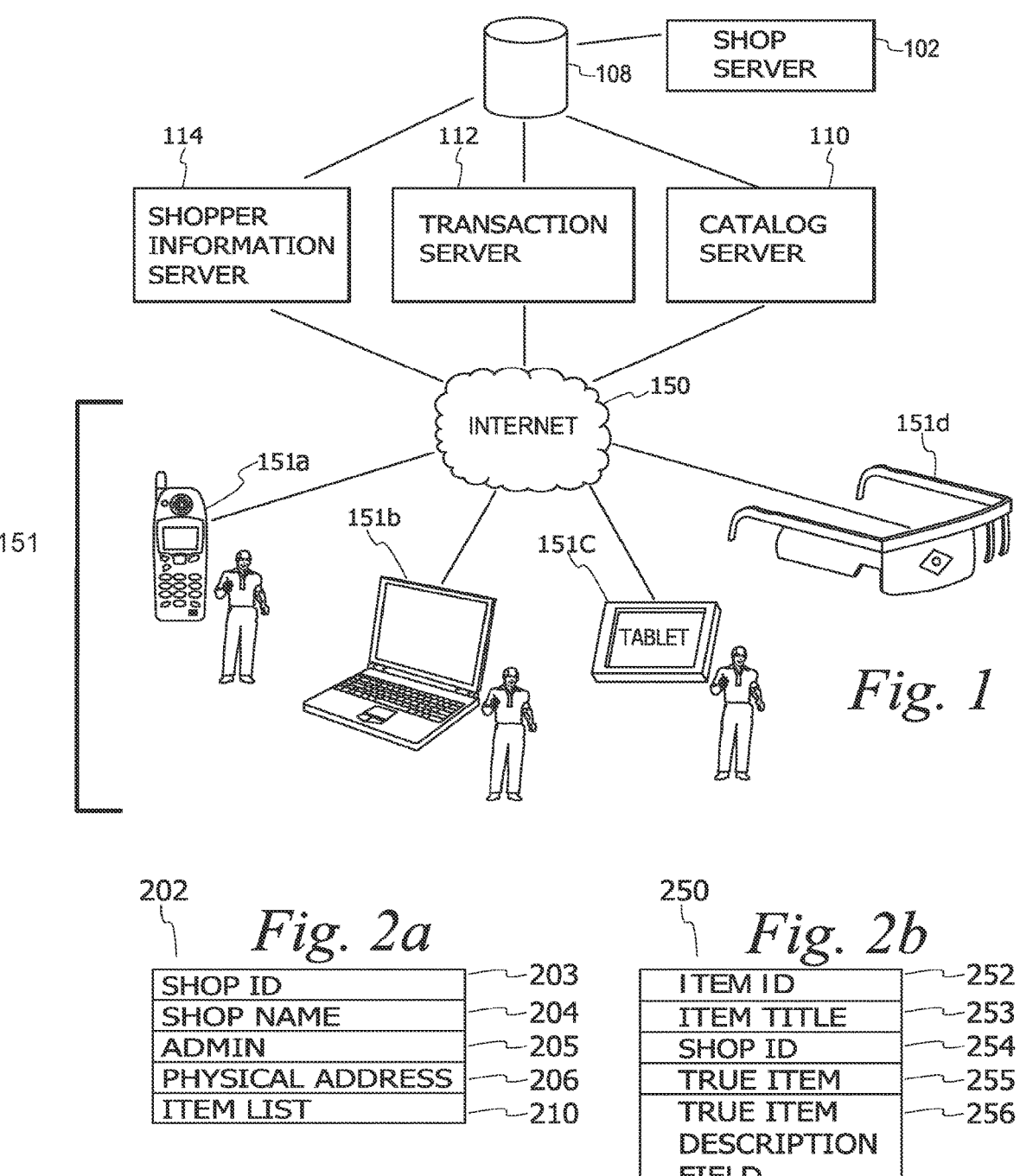
FIG. 1 is a system diagram of an e-commerce system constructed in accordance with this disclosure.
FIG. 2a is a table illustrating a database record corresponding to a shop.
FIG. 2b is a table illustrating a database record for a catalog item.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Thus, in the following detailed description, numerous specific details are set forth to provide a full understanding of the subject technology. It will be apparent, however, that different aspects of the subject technology may be practiced without some of these specific details. In other instances, well-known structures and techniques have not been shown in detail so as not to obscure the disclosure.

Turning to the Figures and to FIG. 1 in particular, a new e-commerce system is disclosed. A shop server 102 accepts catalog information corresponding to a plurality of shops. For example, the shop server 102 may accept catalogs from a variety of retailers, such as, for example, a sunglass shop, a ladies business clothing store, a high fashion shop, a low price fashion shop, a denim clothing shop, an outdoor clothing store, a footwear store, a plus sized ladies clothing shop, an Asian gift store, a confectionary, a bath store, a home goods store, a jewelry store, an adult toy store, an electronics store, a cell phone store, a music store, an audio-visual store, a children's clothing store, a children's toy store, a lingerie shop, and other types of shop. The shop server 102 creates a structured set of electronic catalogs corresponding to the different shops, and stores those catalogs in the database 108.

A shopper information server 114 gathers information regarding shoppers 151, and creates records in the database 108 corresponding to each shopper. The process by which information is gathered from shoppers is explored in more detail later in this disclosure.

In one embodiment, a catalog server 110 presents catalogs of items from the database 108 to shoppers 151. Similarly, a transaction server 112 allows shoppers 151 to place orders with shops and send messages to shop administrators to fulfill those orders.

It should be noted that shoppers 151 can use a variety of means to transact with the disclosed e-commerce system. For example, shopper 151a utilizes a smart phone, while shopper 151b utilizes a standard computer and shopper 151c utilizes a tablet computer. Finally, shopper 151d utilizes a wearable computer system. The type of computer system used to transact with the disclosed e-commerce system is not a limitation of the invention.

In one embodiment, each electronic catalog comprises a plurality of database records. FIG. 2a depicts a shop record 202 constructed in accordance with this example. It comprises a shop identifier 203, which is unique to shops and used to quickly reference the shop record 202 from another database record. It also comprises a shop name 204, an administrator identifier 205, and a physical address 206. The administrator identifier 205 identifies an administrator record (not depicted) that is used to store access and contact information for one or more shop administrators. In addition, the shop record 202 comprises an item list 210 that references catalog items, as described below.

FIG. 2b depicts a catalog item record 250 constructed m accordance with this example. The catalog item record 250 comprises an item identifier 252, which is unique to items in the database 108 and is used to quickly reference the catalog item record 252 from other records in the database. The catalog item record 250 further comprises an item title 253, a shop identifier (corresponding to the shop which the item belongs to), a true item identifier 255, and a list of true item description fields 256.

A true item identifier 255 corresponds to a generic item type. For example, a true item identifier 255 can identify a set of men's running shoes, a pair of sun glasses, or an audio player. The list of true item description fields 256 comprises a collection of fields that vary based on the generic item type. For example, for a set of men's running shoes, the true item description fields 256 could comprise: a) the primary color; b) the secondary color; c) the shoe size; and d) the type of running shoe (i.e., road, trail, etc.). Other item types would have other item description fields.

Figure 3:
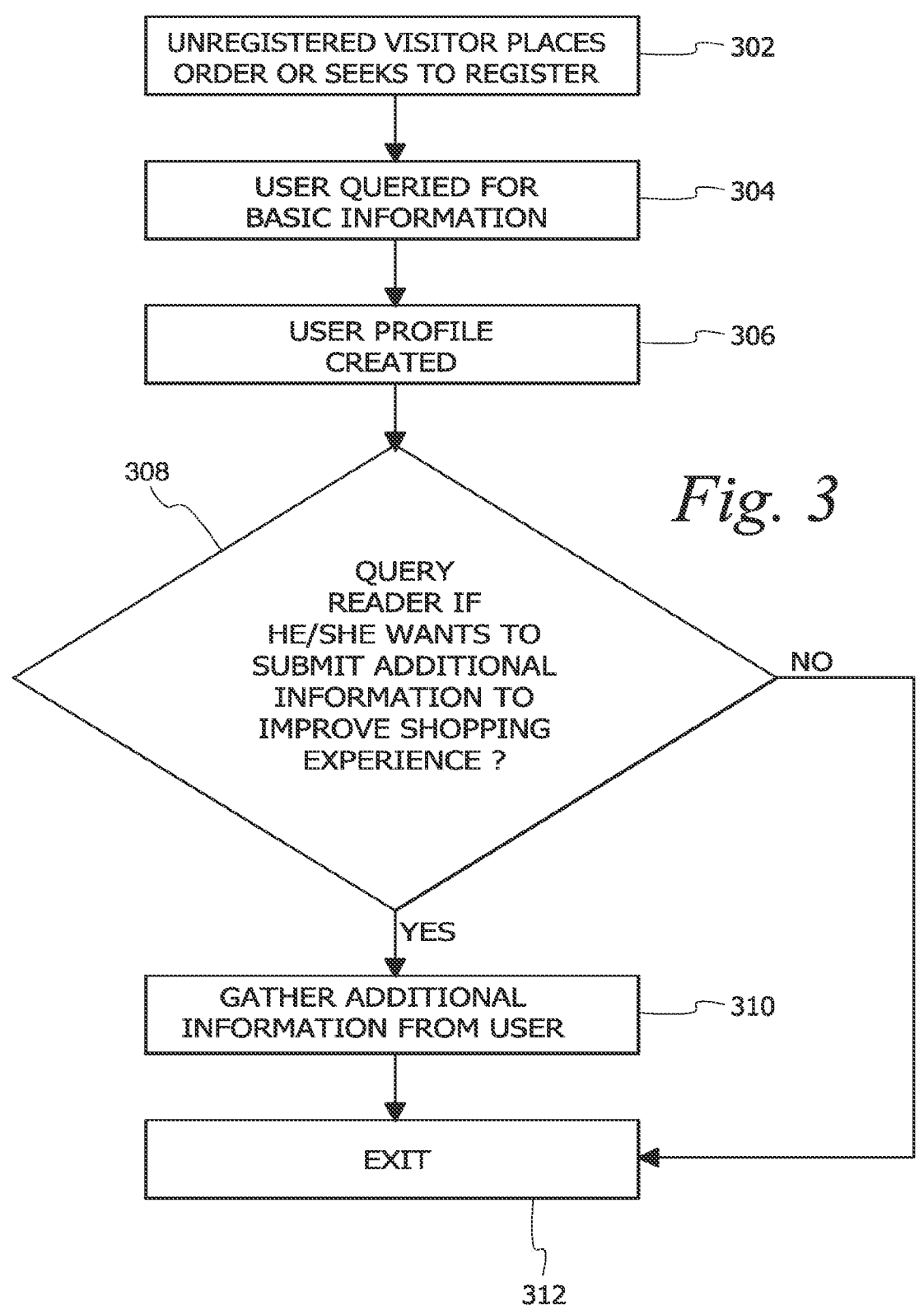
FIG. 3 is a flowchart illustrating a process by which a new shopper's information can be gathered.

Turning to FIG. 3, a flowchart describing one process by which information from a shopper can be gathered is described. In step 302, an unregistered visitor either seeks to register or attempts to place an order, thereby initiating the information gathering process. In step 304, the user is queried for basic information; i.e.; the user's name, address, email address, mobile phone number, communications preferences, billing information, and billing preferences. With regards to communications preferences, a user can select, for example, to receive order confirmations by email, text message, or robo-call. With regards to billing preferences, a user can select to charge one credit card for certain types of expenses, such as clothing, and another credit card for other expenses, such as office supplies. Other payment forms, such as an online wallet, bit coin address, or gift card can also be entered. Moreover, the user can setup rules that allow for "lowest cost routing" of payment. For example, assuming that a user has three credit cards—one that provides better rates for transactions in excess of $100, one that provides better rates for purchases of electronics goods, and one that is designated as purchases made on behalf of the customer's employer.

In one embodiment, a profile for the user is created in step 306. In step 308, the shopper is queried regarding as to whether s/he wants to submit additional information to improve her shopping experience. If the user prefers to not submit additional information, execution transitions to step 312, where the process is exited. However, if the user agrees to submit additional information, it is gathered in step 310 using any of the profile building techniques well known in the art.

One method by which additional information about a customer's information and preferences can be gathered is through a user's mobile device. Mobile devices, such as smartphones, tend to be used by a single person, and accordingly, tend to have reliable information about that person and that person's preferences. Accordingly, in one embodiment of the disclosed e-commerce system, an application running on a mobile device can gather information regarding the customer, such as the customer's address, phone number, and potentially payment means, such as credit cards, online wallets, etc. Further information regarding a customer's preferences can be gathered through interfaces to other applications, as well as through interfaces through social networks and other online identity sources. For example, from a user's social network, a customer's music and movie likes and dislikes can be extracted, as well as, in many cases, the brands that a user likes. From these preferences, similar brands and preferences can be extrapolated and presented to the user.

Figures 4, 5A, 5B:
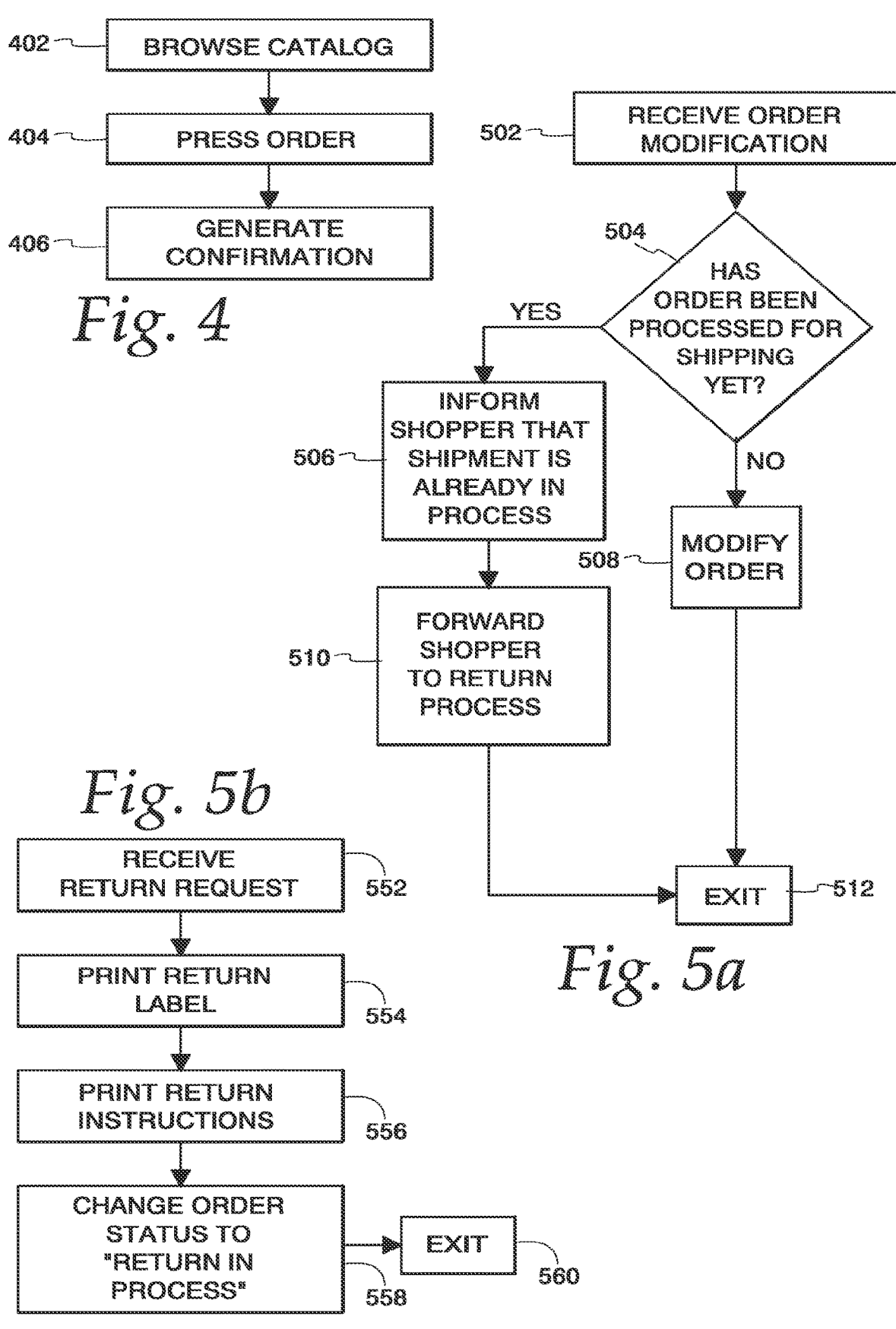
FIG. 4 is a flowchart illustrating a process by which an order can be placed using the disclosed e-commerce system.
FIG. 5a is a flowchart illustrating a process by which an order can be modified by a shopper.
FIG. 5b is a flowchart illustrating a process by which a return can be processed.

FIG. 4 is a flowchart illustrating one process by which an order can be placed by a shopper. The disclosed multi-tenant e-commerce service does not use a "shopping cart." Instead, a shopper simply selects "buy" or an equivalent device, which immediately places the order. A confirmation is sent to the user by the user's preferred communication means, allowing the user to modify or cancel the order.

In one embodiment, in step 402, a shopper browses a catalog, or catalogs, until she/he finds a desired item. The shopper then presses "order" or an equivalent device in step 404. A confirmation is sent to the user by the user's preferred communications means in step 406.

In addition, the disclosed e-commerce system supports group ordering. For example, as opposed to pressing "order," a customer could make an entry that initiates a group order, such as by pressing an "initiate group order" button. The customer could then be presented with a screen that allows the customer to input a list of contacts for other persons who will be participating in the group ordering and an invoice for the amount due from the initiating customer. The amount due from the initiating customer could be an amount set by the initiator, or, alternatively, could be the amount of the item divided by the number of purchasers. The system would then generate messages, such as e-mails or text messages, to the list of contacts specified by the initiating customer. Each message contains a description of the item ordered, such as the catalog listing, a listing of the other persons in the group and their contact information, a listing of which other group members have agreed to the order, an indication of a recommended contribution amount, and a button or other means that allows the user to participate in the group order with a single operation (such as clicking the button). While the recommended contribution amount could be automatically determined or set by the initiator, each contributor could also input a separate amount indicating what they are willing to contribute to the group purchase.

FIG. 5a is a flowchart illustrating one process by which a shopper can modify a placed order. Generally, a shopper will receive an order confirmation via their preferred communications method. The order confirmation will contain a way for the user to modify or cancel their order. For example, an email could contain two HTML links; one to immediately cancel the order, and another to modify the order. If the user has chosen to modify or cancel the order, the process outlined below allows the modification.

In step 502, a request to modify an order is received. In step 504, a check is made to determine whether the order has been processed for shipping. If it has been processed for shipping, execution proceeds to step 506, where the shopper is informed that the order has already been processed. In step 508, the shopper is forwarded to a means to process a return. Returning to step 504, if the order has not yet processed for shipping, execution transitions to step 508, where a modification can be made. For example, the user can modify the quantity of the items ordered, the shipping address to where the order is to be shipped, the properties of the product, such as size, quantity, color, features, etc., or some other type of modification. In addition, the user can modify the order by applying a coupon, which may be in the form of a code that is entered. It should be noted that an order cancellation can be made by modifying the quantity ordered to zero. In step 512, the process is exited.

FIG. 5b is a flowchart depicting a process by which a return can be processed. In step 552 a request is received to return an item. In step 554, a return label is printed, and in step 556, instructions for the customer to return the item are printed. In step 558, a return record is created corresponding to the order with the status "return in process," and in step 560, the process exits. The return will then be received and processed by a warehouse, and the customer's funds returned.

Figures 6, 7:
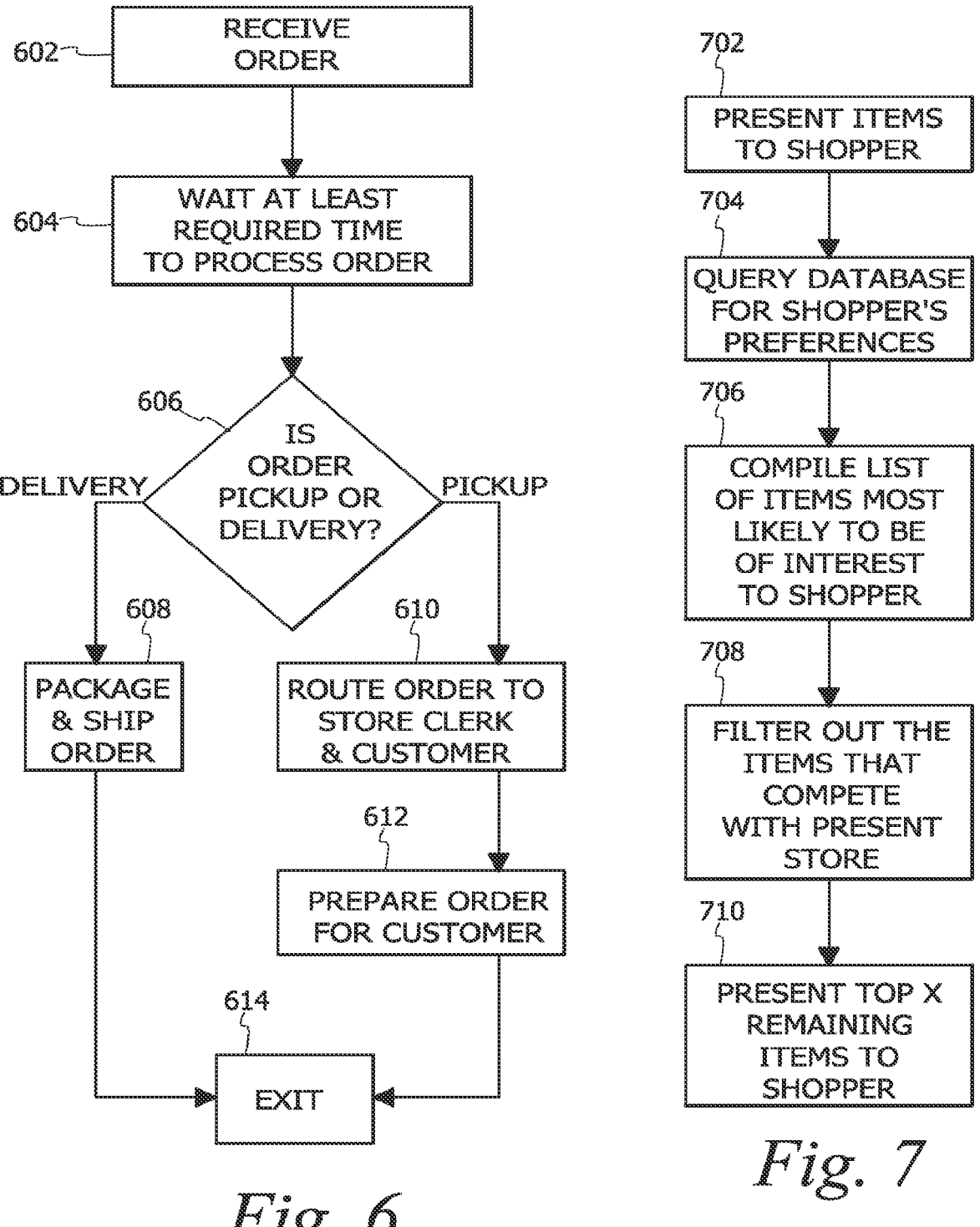
FIG. 6 is a flowchart illustrating a process by which an order can be fulfilled.
FIG. 7 is a flowchart illustrating a process by which items from one shop can be presented to appropriate shoppers of a non-competitive shop.

FIG. 6 is a flow chart depicting one process by which an order placed using the disclosed multi-tenant e-commerce system can be fulfilled. In step 602 an order is received by a shop. In step 604, a time period is marked off during which the shop is not permitted to process the order. This can be accomplished by not forwarding the order to the shop for the prescribed time, or, alternatively, through a business rule prohibiting the shop from changing the order status to "in process" for a prescribed period of time. This time period is required so that shoppers can make modifications or cancel an order shortly after ordering. In step 606, a determination is made as to whether the customer placed the order for delivery, or whether the customer intends to pick the order up. If the customer placed the order for delivery, in step 606 the order is packaged and shipped to the customer, and the process exits in step 614. However, if the customer placed the order for pickup, execution transitions to step 610 where the order is routed to the appropriate physical store closed to the customer's location. In step 612, the order is prepared for pickup by the customer by staff at the store, and the process exits in step 614. This process of order fulfillment allows customers to seamlessly cancel orders as well as to seamlessly return undesired goods.

An important feature of the disclosed multi-tenant e-commerce system is the function of presenting an item from a first shop to shoppers of a second non-competitive shop. This is generally accomplished by gathering a user's preferences, either directly from the shopper, or by monitoring the user's shopping habits. It should be noted that the disclosed e-commerce system encompasses both methods using any of the techniques known in the art.

FIG. 7 is a flow chart depicting one process by which items from one shop can be presented while a user is browsing a non-competitive shop. In step 702 items are presented to a shopper. In step 704, database 108 is queried for the shopper's preferences. Based on those preferences, a list of items most likely to be of interest to the shopper is compiled in step 706. In step 708, any items that would compete with offerings of the shop that the customer is presently browsing are filtered out. In step 710, the X items that are most likely to appeal to the customer are presented to the customer within the shop that s/he is browsing. Generally, X should be a fairly small number, such as 1-3 items, although certain embodiments could present more items to a user.

Figures 8, 9:
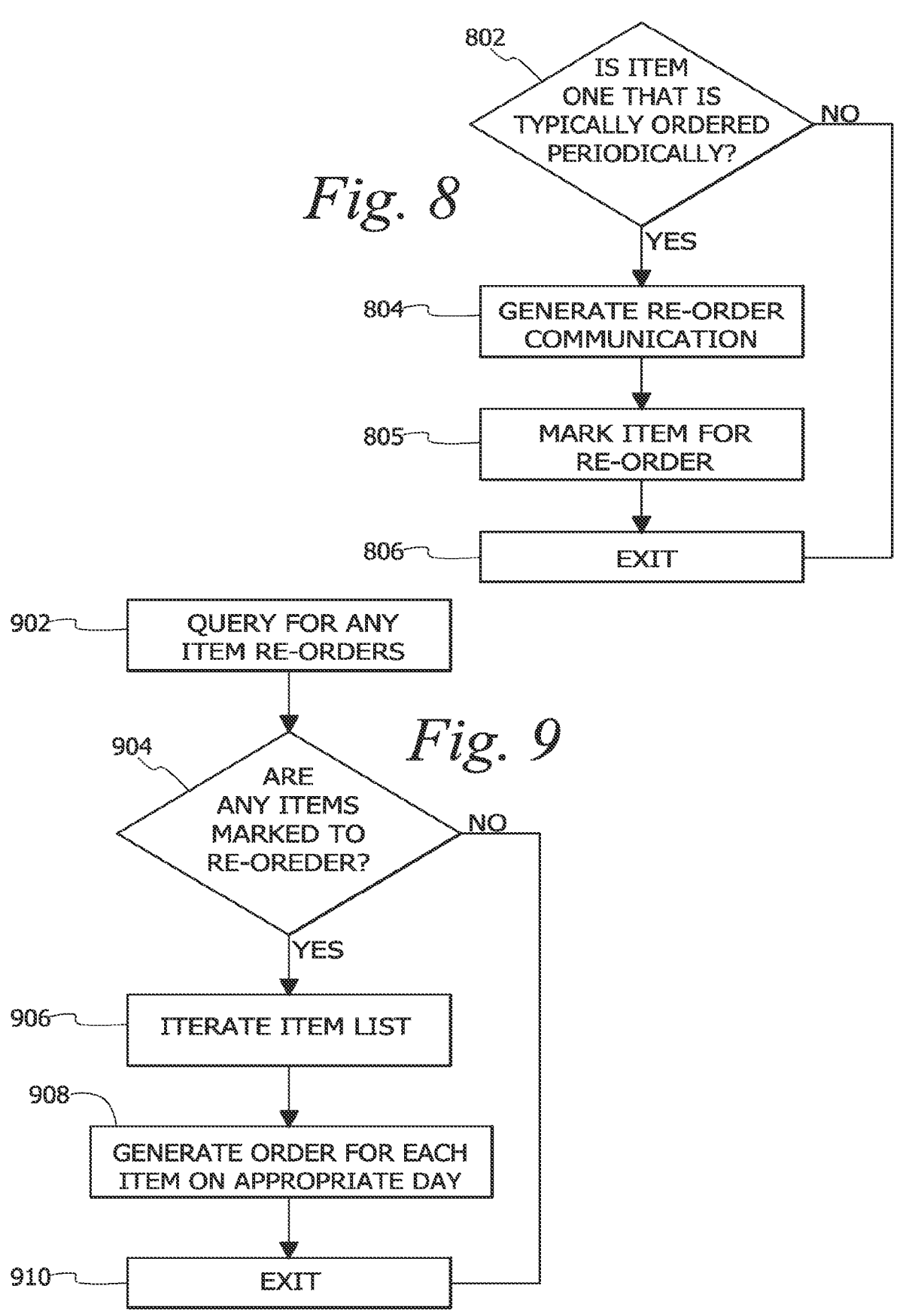
FIG. 8 is a flowchart illustrating a process by which items can be automatically
FIG. 9 is a flowchart illustrating a process by which reorders can be generated by the disclosed e-commerce system.

FIG. 8 depicts a flowchart describing one process by which certain items can be flagged for automatic reordering. In step 802, after an item is ordered a check is made to determine if it is one that is often ordered periodically. Items that are often ordered periodically include staple foods, such as rice, cleaning products, such as bleach, and personal care products, such as deodorant. In addition, other items may be flagged for reordering by a particular customer, or by the collective shopping patterns of all customers of the system. If the recently ordered item is not that is often ordered periodically, the process exits in step 806. However, if the recently ordered item is one that is often ordered periodically, execution transitions to step 804, where a communication to the shopper that ordered the item is generated and transmitted to the shopper, and in step 805, the item is marked for reordering on a standard schedule. The process then exits in step 806.

With regards to the communication generated in step 804, it can be for example, an email, a text message, or a robo-call, as indicated by the shopper's preferences (if a preference is set). In the communication, the user will be notified that a periodic order has been created, and given an option to modify the reorder period, or cancel it entirely. For example, an email can contain a hyperlink to a page allowing the user to set the reorder period or cancel the reorder entirely.

Turning to FIG. 9, a flowchart depicting one process by which periodic reorders can be automatically generated. The depicted process is to be run at a periodic interval, such as one time per day, and can be run for every shopper in the database. In step 902, a shopper's record is queried to determine if there are any item reorders. If there are not, the process exits in step 910. However, if there are item reorders, the list of reorder items is iterated in step 906, and, for each item reorder that should be ordered at the time the process is ran, a new order is generated and processed in step 908 as discussed earlier in this disclosure. The process then exits in step 910.

Another feature of one embodiment of the disclosed e-commerce solution is to allow lowest cost routing of orders by merchants (as well as by consumers as previously discussed). For example, it is well known that different payment processors charge different rates depending on various factors, such as the particular card that is presented. Accordingly, a merchant can configure the e-commerce system so that payments by, for example, Discover Card, are processed by a first processor, while American Express payments are processed by a second processor, and payments by Mastercard and Visa are processed by a third processor.

In addition, the system can periodically send communications, such as emails and SMS texts to shoppers that use the system. The communications can contain catalog listings of items that the shoppers are likely to be interested in based on the shopper's buying patterns, or that merchants are attempting to promote to certain classes of shoppers. In addition, the listings can contain indicia that allow the user to easily purchase the listed items. For example, an email or push notification can contain a button for each item listed in the communication; by pressing the button, the user can purchase the item with a single click as outlined herein. Similarly, an SMS communication can indicate a numeric code that the user replies with to purchase a particular item.

One issue that arises with conventional e-commerce solutions is that customers can abandon an order prior to completing it. This can lead to items being "orphaned" in the shopping cart. Items can be orphaned for a variety of reasons. First, the user can intentionally abandon the order. This would occur, for example, if the user did not want the items. Second, a user may experience a technical issue, such as a hardware or software crash, or a network issue, prior to completing the order. Or third, a user may have something more urgent arise, that distracts her attention from shopping prior to her completing the order. In cases two and three, both the user and the store are missing the benefit of completing the order.

In accordance with one embodiment, a communication, such as an email, SMS text, or push notification is generated and sent to a shopper after items are orphaned in a shopping cart for some period of time, such as, for example, four hours. The communication contains a listing of the items in the abandoned cart, and a "complete order" (or equivalent)

device. By pressing the complete order (or equivalent) device, the order is completed, and the items in the cart are sent to the shopper.

The disclosed e-commerce system also envisions improving on the traditional retail shopping experience by providing a novel new way to shop for goods. This embodiment is explained with reference to FIGS. 10*a* and 10*b*. In particular, the disclosed shopping system would allow customers of a retail store to purchase items simply by placing them in a specialized tote bag 1000. The tote bag 1000 contains a simple circuit woven into one of the interior walls or bottom comprising a battery, an active RFID device, and a wireless transceiver (such as an 802.11 transceiver). Each tote bag 1000 will need to be registered to a particular person who will need to have a preregistered payment means, such as a credit card or online wallet. To use this system, every item in the store must include a passive RFID, which, when brought in proximity to the active RFID of the tote bag 1000 signals a purchase by the tote bag's 1000 owner.

Turning to FIG. 10*b*, a simple block diagram of the tote bag circuit is disclosed. A battery 1002 powers an active RFID 1004. The active RFID 1004 can detect when a passive RFID coupled to a retail item (not shown) is brought into close proximity, such as when the item is placed in the tote. When this occurs, the active RFID 1004 signals the microprocessor 1006, which then causes the active RFID 1004 to read an identifier stored in the passive RFID corresponding to the item to which the passive RFID is attached. This identifier is then passed to the microprocessor 1006, which then uses the transceiver 1008 to transmit the item identifier to a store server (not shown) which completes the purchase on behalf of the user.

Given that the tote bag 1000 may come into contact with items that are within the store, but are not placed inside the tote bag 1000, there is a possibility that items could be spuriously purchased. One way to prevent this would be to shield the outside of the tote bag 1000 to prevent even a close coupling of the active RFID 1004 to a passive RFID (not shown) from activating the active RFID.

Figures 10A, 11A:
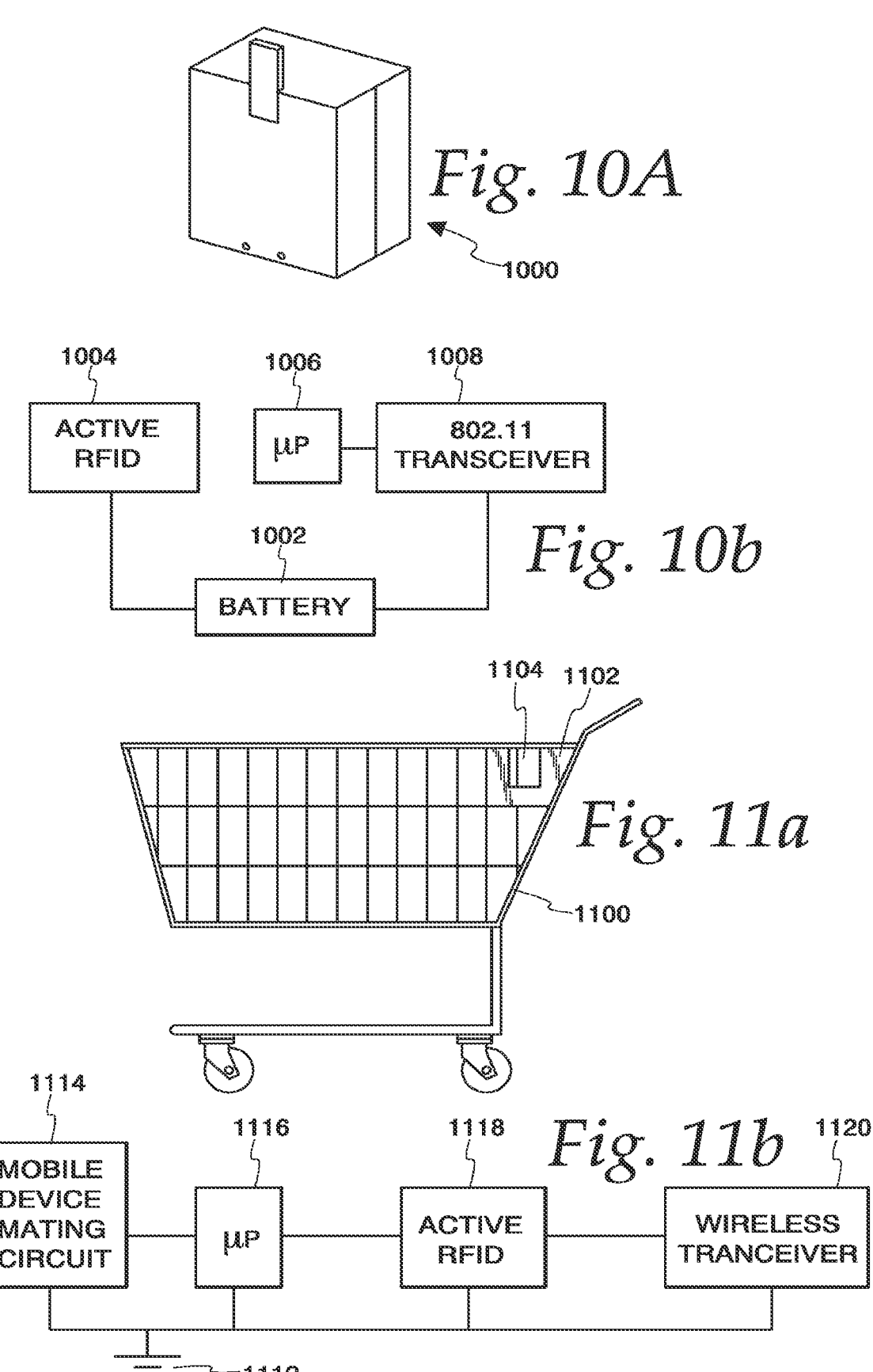
FIG. 10a is a perspective view of a tote bag constructed in accordance with the disclosed e-commerce system.
FIG. 11a is a side view of a shopping cart constructed in accordance with the disclosed e-commerce system.

In another embodiment of the disclosed retail shopping service, consumers can utilize a mobile computing device to check out a shopping cart. Generally, consumers will register their mobile device with the shopping cart, which will operate similarly to the previously described tote bags 1000. Turning to FIGS. 11*a* and 11*b*, each shopping cart 1100 incorporates a circuit board 1102. In addition, in embodiments that are intended to mate with smart phones, a cradle 1104 can be provided.

The circuit 1102 can comprise a battery 1112, a mobile device mating circuit 1114, a microprocessor 1116, an active RFID, and a wireless transceiver 1120. The mobile device mating circuit 1114 can be a wired circuit, a wireless circuit, or both. For example, the mobile device mating circuit 1114 can be a wireless mating circuit, such as, for example, a Bluetooth wireless mating circuit. In such an embodiment, a customer would need to obtain an identifier (such as a number) from the shopping cart 1100, and input that into an application on the user's mobile computer device, which would then mate with the shopping cart 1100. The mobile device mating circuit 1114 can also be a wired circuit, such as, for example, a USB circuit. In such an embodiment, the user would physically mate a USB port on her device with a USB connector on the shopping cart 1100, which would activate an application on the user's mobile computing device allowing the user to confirm that the mating had occurred.

After the user's mobile computing device was mated with the mobile device mating circuit 1114, the microprocessor 1116 verifies that the user's mobile device contains a valid payment option. The active RFID 1118 and wireless transceiver operate similarly to the same devices in the tote bag embodiment.

In particular, in one embodiment, the active RFID 1118 can be mounted in a central position within the shopping cart 110. The active RFID 1118 detects when a passive RFID coupled to a retail item (not shown) is brought into close proximity; i.e., by the shopper moving it to within a few inches of the active RFID 1118. When this occurs, the active RFID 1118 signals the microprocessor 1116, which causes the active RFID 1118 to read an identifier stored in the passive RFID corresponding to the item to which the passive RFID is attached. This identifier is then passed to the microprocessor, which then uses the transceiver 1120 to transmit the item identifier to a store server (not shown) which completes the purchase.

Figure 12:
FIG. 12 is a display illustrating a view that a shopper can receive on first starting a smart phone shopping application.
Figure 13:
FIG. 13 is a display illustrating a view that a shopper can receive while entering a search term.

FIGS. 12 and 13 illustrate one embodiment of a smart phone application for use with the disclosed multi-tenant e-commerce system. Turning to FIG. 12, one embodiment of a view is depicted that a shopper that has already registered with the e-commerce system could see on first entering the application. The view depicted is customized to the shopper, and does not depict the listings on any particular store. Rather, based on the preferences of the user as determined by information submitted by the user or by monitoring the user's activities, products of many different shops can be displayed. FIG. 13 depicts a search by a shopper. In this embodiment, discovery of items is driven by the user's preferences and by searches conducted for specific items. As depicted, a standard soft keypad is used to enter a search term.

As explained herein, a potential purchaser may browse through an electronic catalog of an application or Web page of a vendor and select various items that he/she would like to purchase. Typically, the user loads the selected items into an electronic shopping cart, and then once the loading of items is completed, he/she proceeds with their electronic purchase. However, shopping carts add little to no value in the online shopping experience, as many times the shopping cart serves as a vehicle for del ay and abandonment, rather than serving as a vehicle for quick transactions. Indeed, consumers often place items in a shopping cart, showing an intent to purchase, but then forget, get distracted or abandon the shopping cart for a variety of reasons. In the past, electronic commerce software has generally attempted to shoe horn the concepts of a physical shopping experience into software. However, the user experience of the traditional physical shopping experience does not match the actions of modern, electronically savvy consumers.

Accordingly, the present disclosure provides a system and method for purchasing a plurality of items via quick transactions from a vendor system. The quick transaction system, which does not require loading the items selected for purchasing in a shopping cart, eliminates wasteful steps that have little relevance in online shopping, thereby quickening the purchasing transactions of the purchaser/user.

In one example, after accessing a screen of a vendor's electronic store, for example, an online catalog, mobile retail application, or website, using a computing device, when a consumer decides to purchase an item found on the screen, the user will select to buy the item, typically by clicking/tapping on a "buy" button. If the consumer is not logged in and/or has not previously entered all of the required information to complete a transaction, the quick transaction system generates and displays a user interface asking the user to log in or enter the unknown user information that is required to complete the transaction, such as billing address, shipping address, and payment method. As the consumer continues to electronically select additional items to purchase in the electronic store by selecting the "buy" button for each additional item, the transaction for the additional item is automatically processed. This allows the consumer to quickly buy the products in which the consumer is interested. As such, the quick transaction system does not require loading the selected items into a shopping cart, and instead allows every transaction to be discrete. Therefore, each purchased item/SKU will be a separate transaction. The consumer is able to transact and operate within the electronic store the same way that they currently do, but instead of having an extra step of placing each item into a cart, they will be able to immediately purchase each item.

In one implementation, the quick transaction system will handle the batching of individual transactions into one batch transaction that will be the aggregate of the set. This will allow shipping and packing to be more intelligent. Batching is done on the back end based on preset retailer information. For example, a retailer may define a grouping window whereby all transactions that occur within a specific timeframe may be grouped for discounted shipping. Accordingly, if a first item is purchased in a first transaction and the consumer subsequently is browsing to potentially make a second purchase in a second transaction within the preset grouping window, the quick transaction system may adjust certain pricing, such as the shipping cost, of the second purchase if the second purchase can be shipped with the first purchase.

In one embodiment the quick transaction system is associated with an application, such as a mobile application. In such an example, the application is referred to as a quick transaction application. The quick transaction system, including such a quick transaction application, may be provided on any suitable computing device, such as a server, a personal computer, a tablet computer, a smartphone, a wearable computer system and the like. The quick transaction system may be linked to one or more electronic sales systems, such as electronic commerce systems, applications, websites, and the like. As explained herein, a user may be required to onboard or sign up for the quick transaction system. The user may then browse through a sales website, mobile application or online product catalog to identify and purchase products or services, for example. Alternatively, the user may be required to sign up for the quick transaction system, i.e., onboard, after selecting a product for purchase.

Figures 14A, 14B:
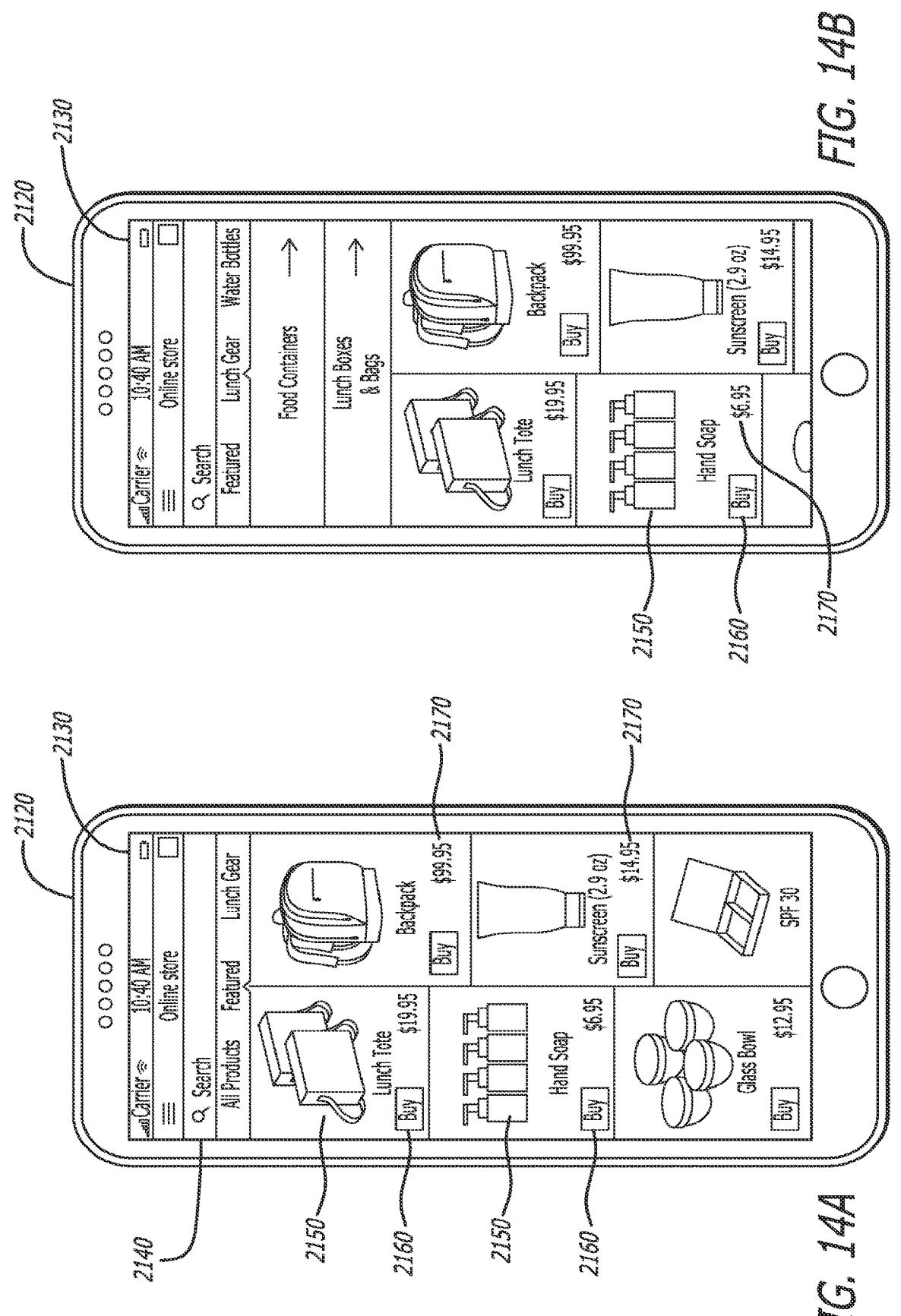
FIGS. 14A-14D illustrate exemplary electronic pages displayed on a screen of a computing device of a user.
Figure 14D:
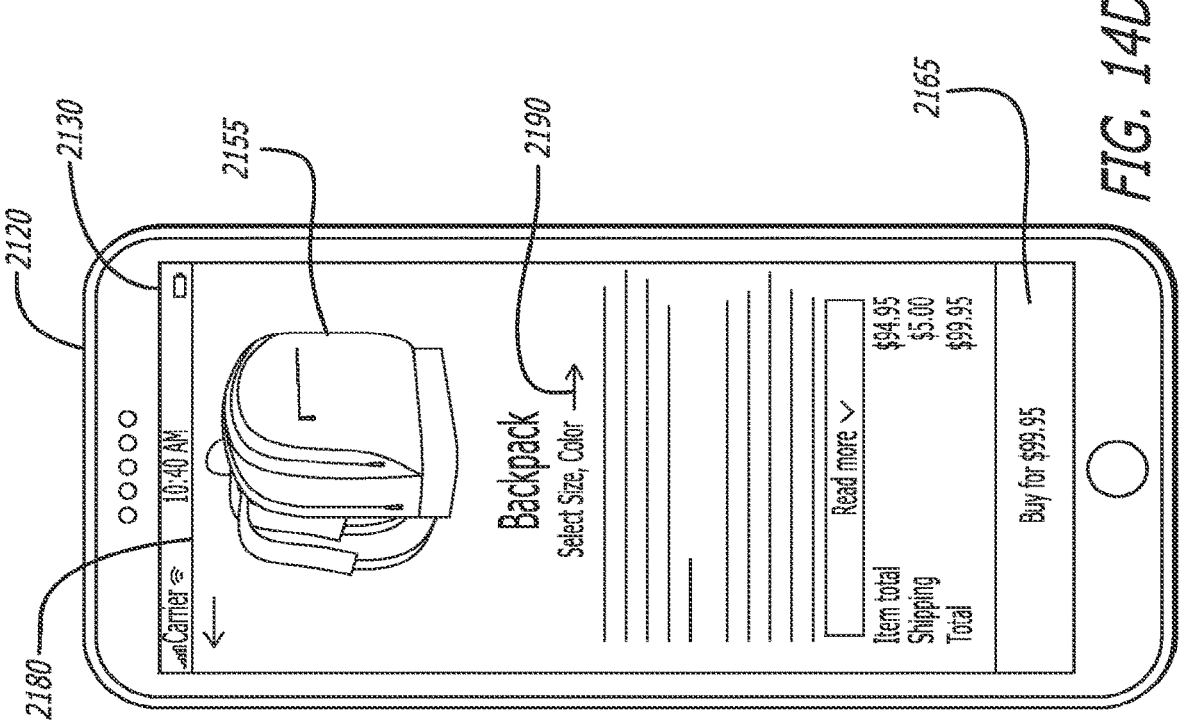
Figure 14C:
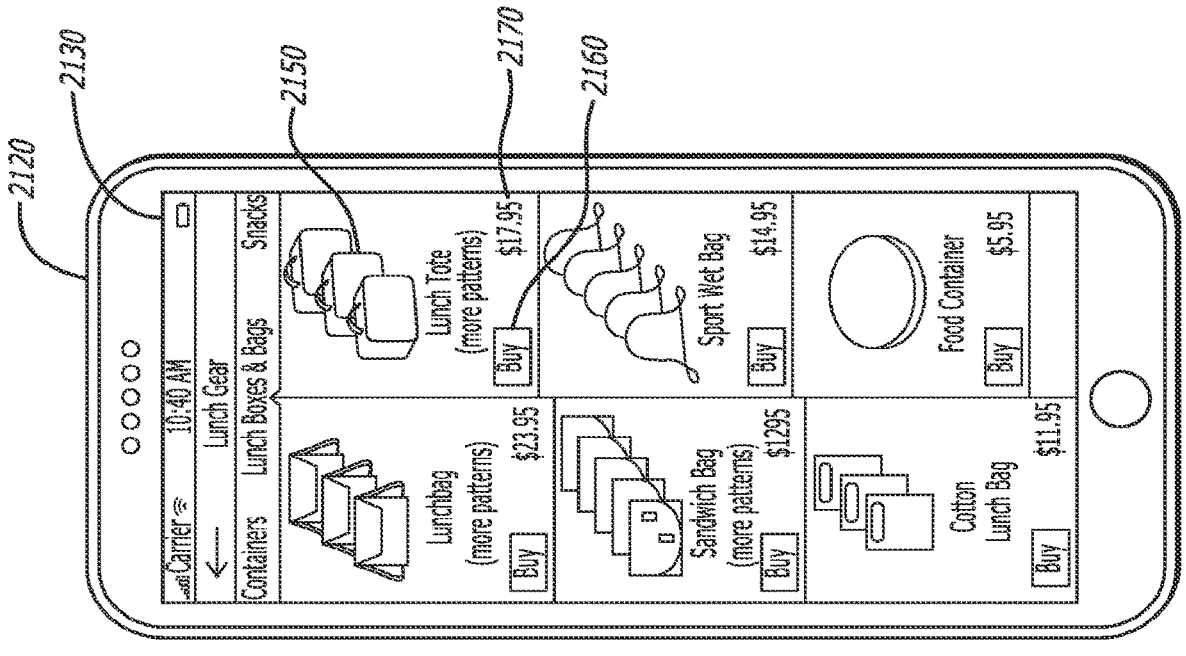

FIGS. 14A-14D illustrate exemplary electronic pages displayed on a screen 2130 of a computing device 2120 (e.g., smartphone) of a user during product browsing. As shown in FIGS. 14A-14C, when the user accesses a vender site, such as via a mobile application, to browse for products of interest, electronic pages 2140 are displayed that include a set of products 2150 and corresponding "Buy" buttons or icons 2160 and prices 2170. For example, all of the displayed products 2150 may be from the vendor who owns the vendor site. As another example, some of the displayed products 2150 may be from the vendor who owns the vendor site and other displayed products 2150 may be from other vendors, which may be selected based on determining user preferences. Alternately, the electronic pages 2140 that are displayed to the user may not be based on the user entering a vendor site, but may instead be based on preferences of the user determined by information submitted by the user and/or by monitoring the user's activities, so that products 2150 of different vendors may be displayed without the user ever entering a specific vendor site.

In one example, once the user selects the "Buy" button or icon 2160 associated with a selected product 2155 on a screen 2130 of a vendor site, the quick transition system will immediately process the transaction. If, however, the user desires to select a different size or color, for example, of the product, the system generates and displays a user interface 2180, such as shown in FIG. 14D, which identifies additional details or options for the selected product 2155. In the example shown in FIG. 14D the selected product 2155 is a Backpack. The displayed user interface 2180 shown in FIG. 14D includes the opportunity for the user to review additional options for the Backpack by selecting the "Select Size, Color" button/icon 2190 for selecting an alternate size and color of the Backpack. Alternately, if the user does not want to select an alternate size and/or color of the Backpack, the system provides a "Buy" button/icon 2165 for immediate purchasing of the identified Backpack.

In accordance with the present disclosure, the quick transaction system does not display a "shopping cart" button to enable the user to load a selected product into a shopping cart and to keep on browsing for additional products prior to purchasing the selected product. Instead, the quick transaction system provides a "Buy" button/icon that has a complete ecommerce experience built within. No additional shopping cart processing is required. The entire infrastructure for completing the transaction exists internally within the system upon selecting the "Buy" button/icon. Further, since the transaction processing begins immediately upon selecting the "Buy" button/icon, the consumer is not sent to another site or page to complete the transaction. This process is not limited to an electronic retail shopping website or mobile application. Such system could be provided in an email, a tweet, an electronic game, etc. Upon selection of the "Buy" button/icon, regardless of the type of application in which the "Buy" button/icon is located, if the user is known and has previously onboarded, the transaction will be immediately processed.

Figures 15A, 15B, 15C:
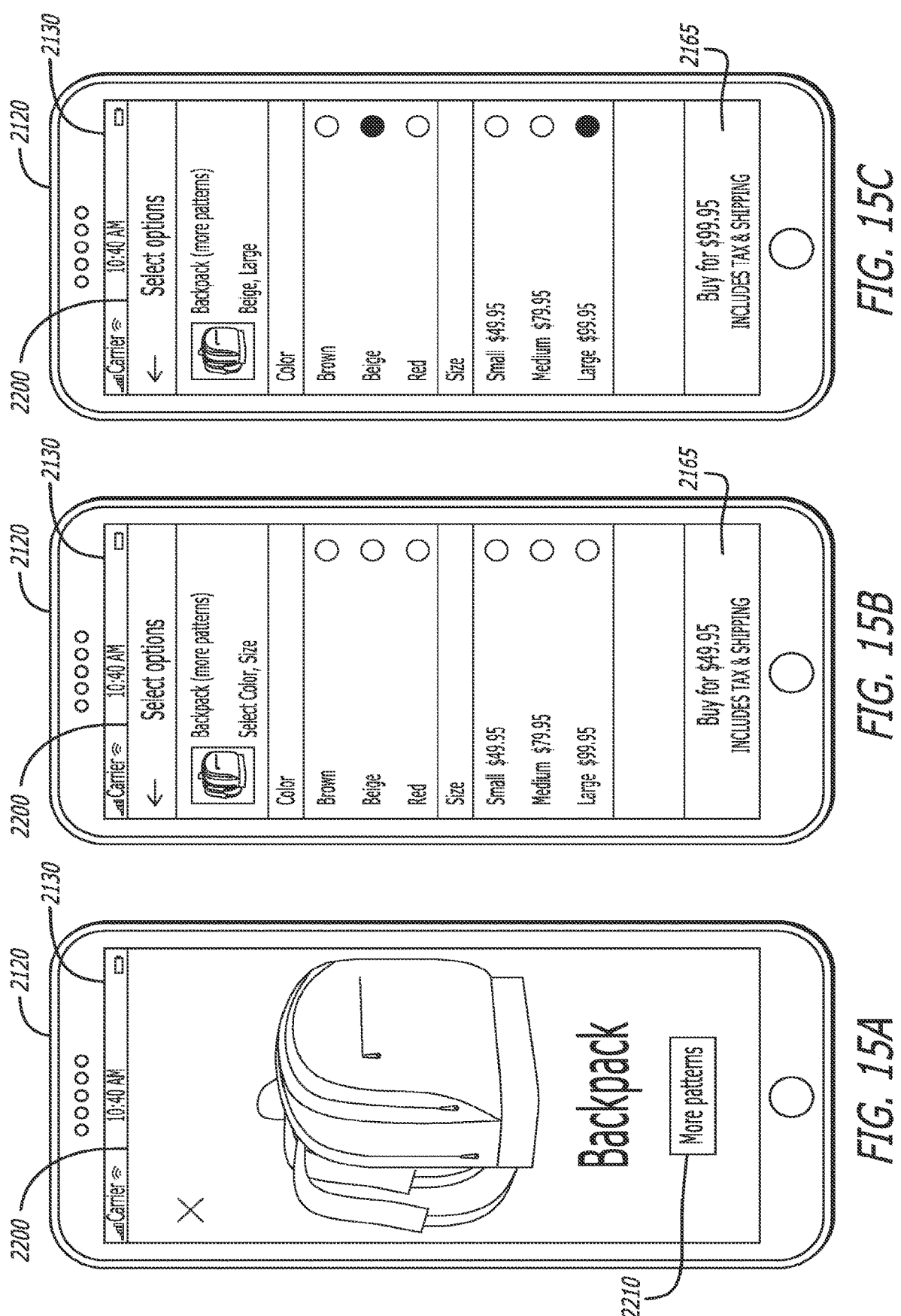
FIGS. 15A-15C illustrate exemplary user interfaces for providing the user a selection of options of a chosen product.

In one embodiment, once the user has selected a product that he/she is interested in purchasing, such as the Backpack product shown in FIG. 14D, and if the user is interested in viewing additional options for the Backpack, such as by selecting the "Select Size, Color" button/icon 2190 in FIG. 14D, the quick transition system generates and displays additional user interfaces, such as interfaces 2200 shown in FIGS. 15A-15C, to allow the user to select additional options, such as color and size options, for the Backpack. For example, the system may then direct the user to an interface as shown in 15A, which includes a picture of the default color and size of the selected product 2155 (e.g., the Backpack), as well as a "More Patterns" button 2210. In this example, if the user selects the "More Patterns" button 2210 provided on screen 2200 of FIG. 15A, the system may direct the user to screen 2200 shown in FIG. 15B. After the user has selected a color option and a size option for the Backpack, as shown in FIG. 15C, and after the user has tapped the "Buy" button/icon 2165 shown in FIG. 15C, in this example the transaction (i.e., the purchase) will be processed if the user is logged in to the application. At that point the transaction will be processed as shown in FIG. 16D.

Figures 16A, 16B, 16C:
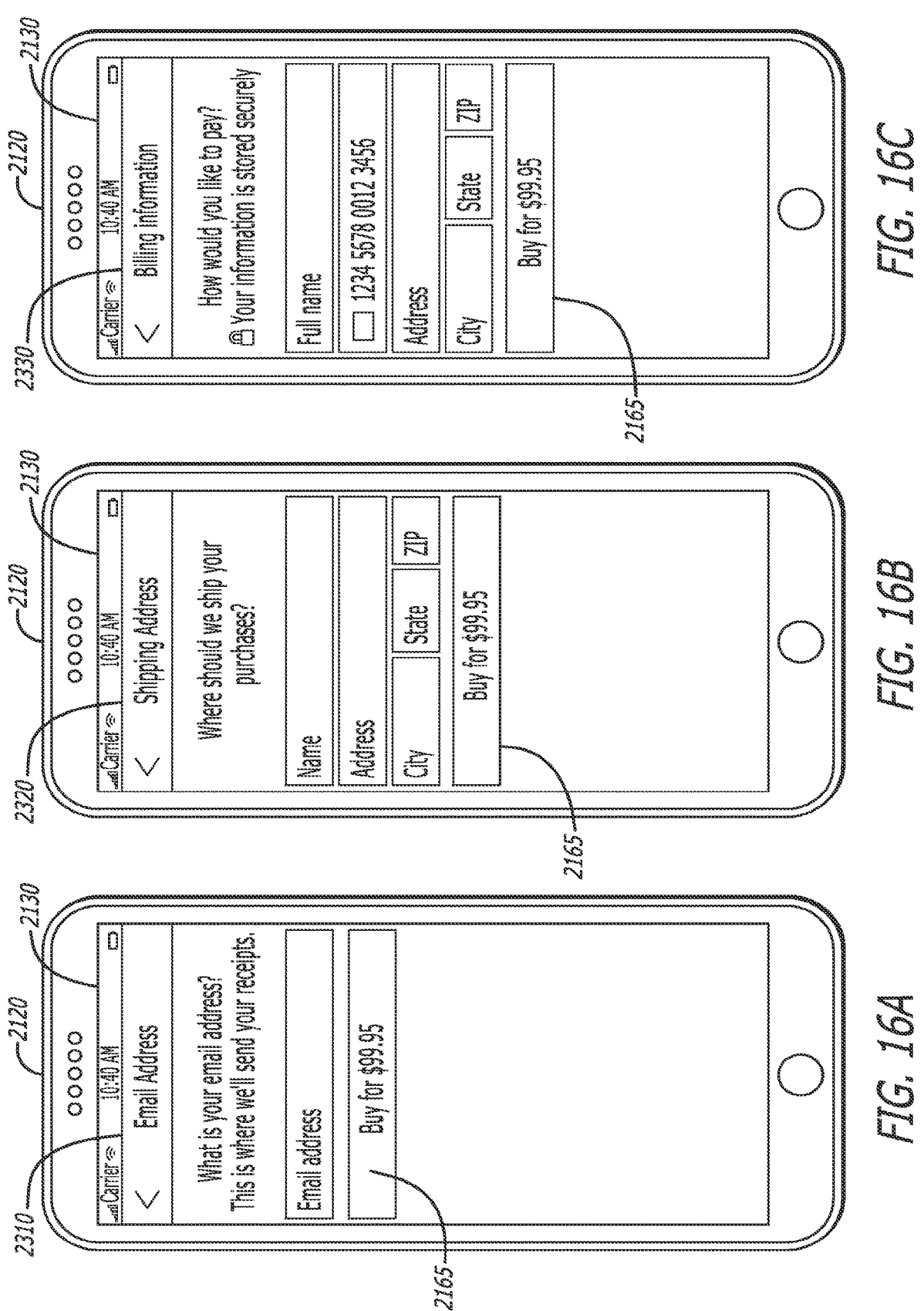
FIGS. 16A-16C illustrate exemplary user interfaces for obtaining a new shopper's information.

If the user is not logged in or if the consumer is a new user, the system will request additional information from the user. In one example where the consumer is a new user, the quick transaction system displays additional user interfaces, for example such as interfaces 2310, 2320, 2330 shown in FIGS. 16A-16C, to request entry by the user of additional required information, such as email address, shipping address, and mode of payment. Additionally, other displayed user interfaces (not shown) may request additional information, such as employment information and education information by the new user. The system or application also determines if the user information entered by the user (i.e., billing address, billing credit card, etc.) is valid.

Figure 16E:
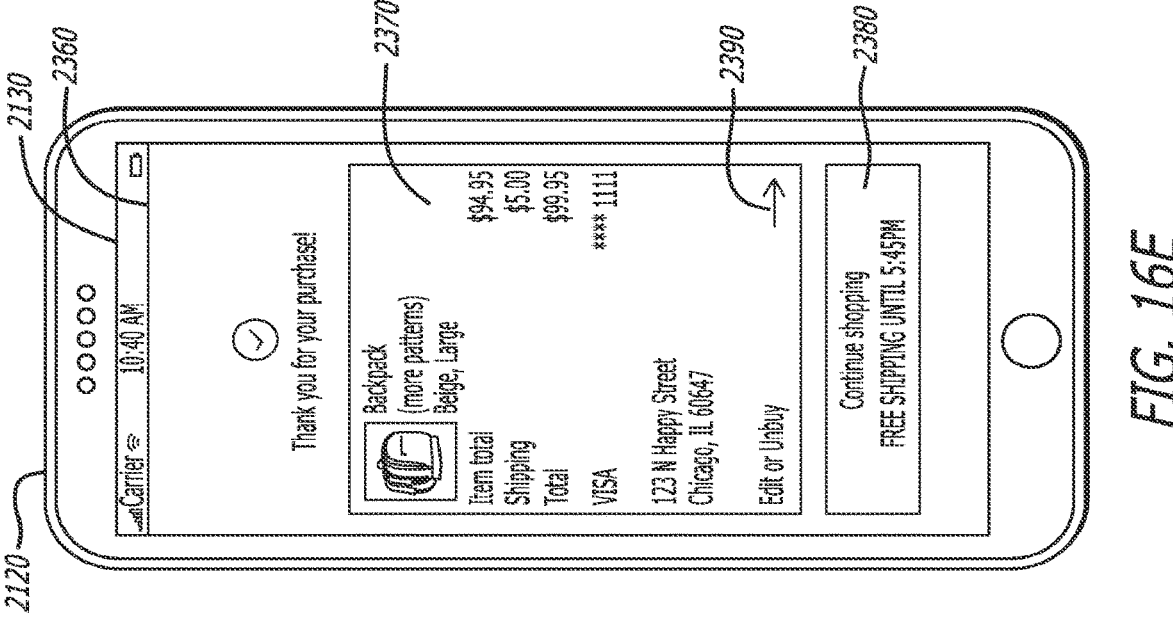
FIGS. 16D-16E illustrate exemplary user interfaces displayed to acknowledge the purchase of the selected product by the new shopper, and to provide options to edit the purchase of the product, to un-buy the product, and to continue shopping.
Figure 16D:
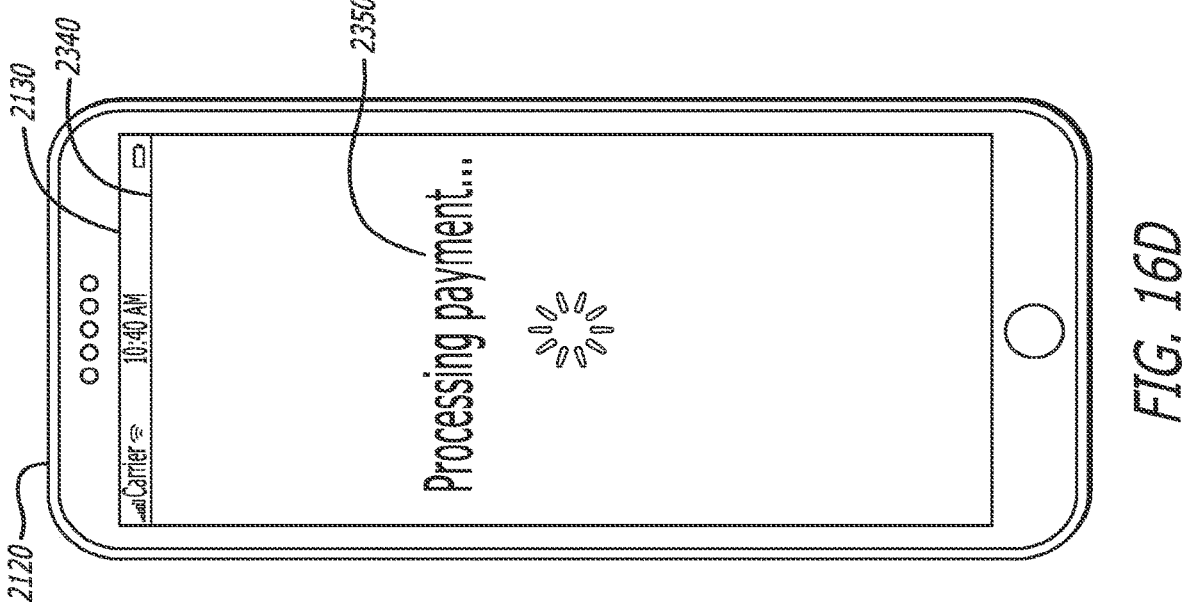

Referring to FIG. 16D, once the required information has been provided by the new user, or if the user is an existing user that has already logged in, the quick transaction system displays a user interface 2340 that provides an indication 2350 that the system is processing the transaction. After the purchase transaction has completed processing, the quick transaction system provides confirmation 2370 (e.g., a receipt), such as in a user interface 2360 shown in FIG. 16E, that the purchase transaction has been completed. The system also provides an opportunity for the user to edit or unbuy this purchase through an "Edit or Unbuy" button/icon 2390 provided in user interface 2360. The "Edit or Unbuy" button/icon 2390 enables the user to change or cancel the order before the purchased product is shipped. Additionally, the system provides the user the ability to continue shopping through a "Continue Shopping" button/icon 2380, which is also provided on interface 2360 in this example. Because the system has smart batching technology, the system also allows for perks to entice the user to continue shopping, such as free or discounted shipping for additional products purchased within a period of time preset by the retailer.

Figures 17A, 17B, 17C:
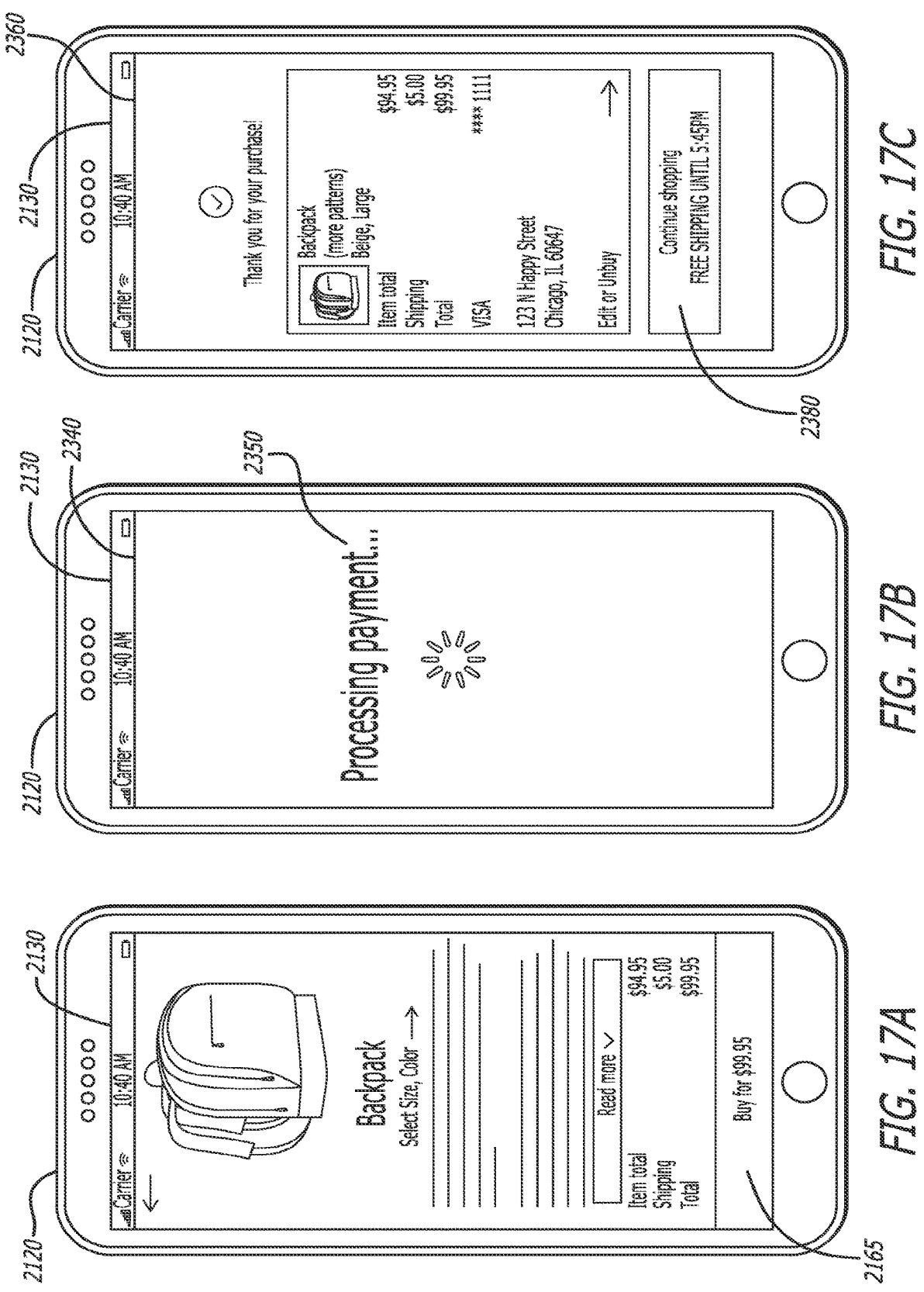
FIGS. 17A-17C illustrate exemplary user interfaces displayed to acknowledge the purchase of the selected product by an existing shopper, and to provide options to edit the purchase of the product, to un-buy the product, and to continue shopping.

As shown in FIGS. 17A-17C, if the user is not a new purchaser and is logged in to the system, after the user selects the "Buy" button/icon 2165 to buy the product as shown in FIG. 17A, the quick transaction system automatically displays the user interface 2340 shown in FIG. 17B that provides the indication 2350 that it is processing the transaction, and the system will then provide a completed transaction screen 2360 as shown in FIG. 17C.

In accordance with the present disclosure, a user should onboard or log in to the system to conduct a transaction. Accordingly, once the user conducts a first transaction, as that user continues to browse additional items to purchase, and upon selection of an additional item for purchase, such as in one example selecting the "Buy" button/icon 2160 associated with a product shown in FIGS. 14A-14C, the purchase transaction for the additional item is automatically processed. Thus, once the user clicks on the "Buy" button/icon 2160 associated with a second product 2150, as displayed, for example, in FIGS. 14A-14C, or in any other electronic page 2140 accessed by the user using his computing device 2120, the quick transition system will automatically process the transaction.

Figure 18B:
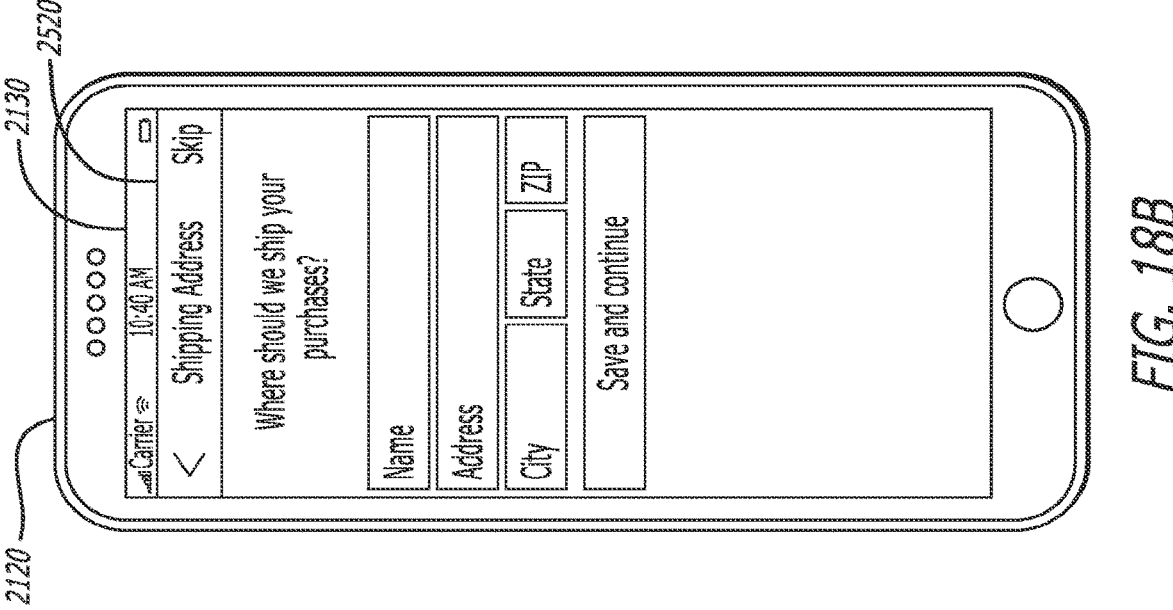
FIGS. 18A-18D illustrate exemplary user interfaces of a quick transaction application in accordance with the present disclosure.
Figure 18A:
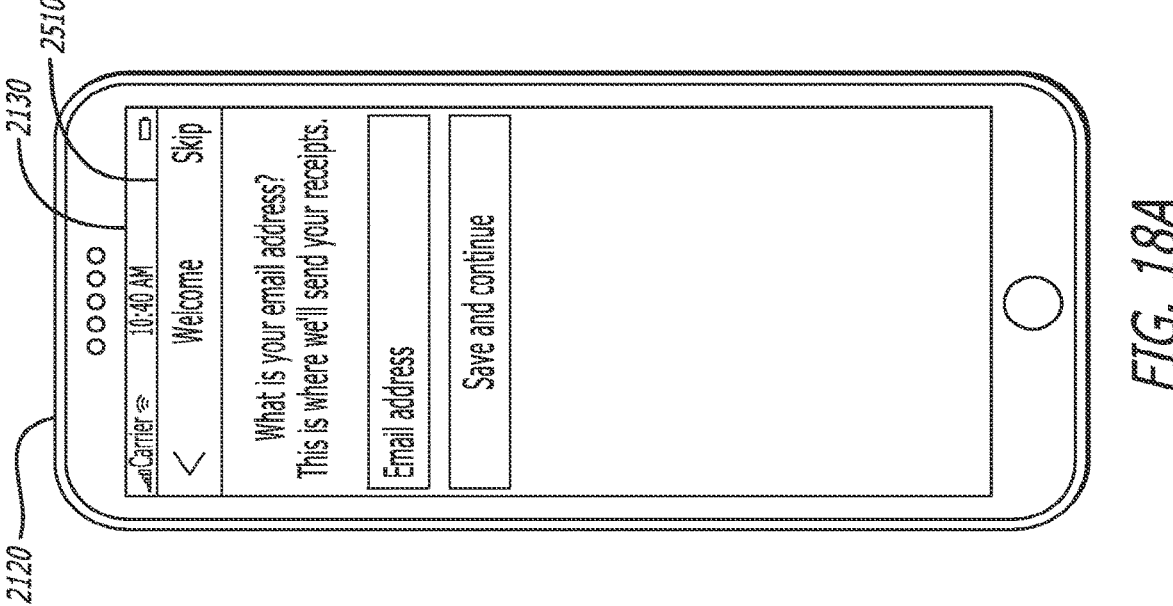
Figure 18D:
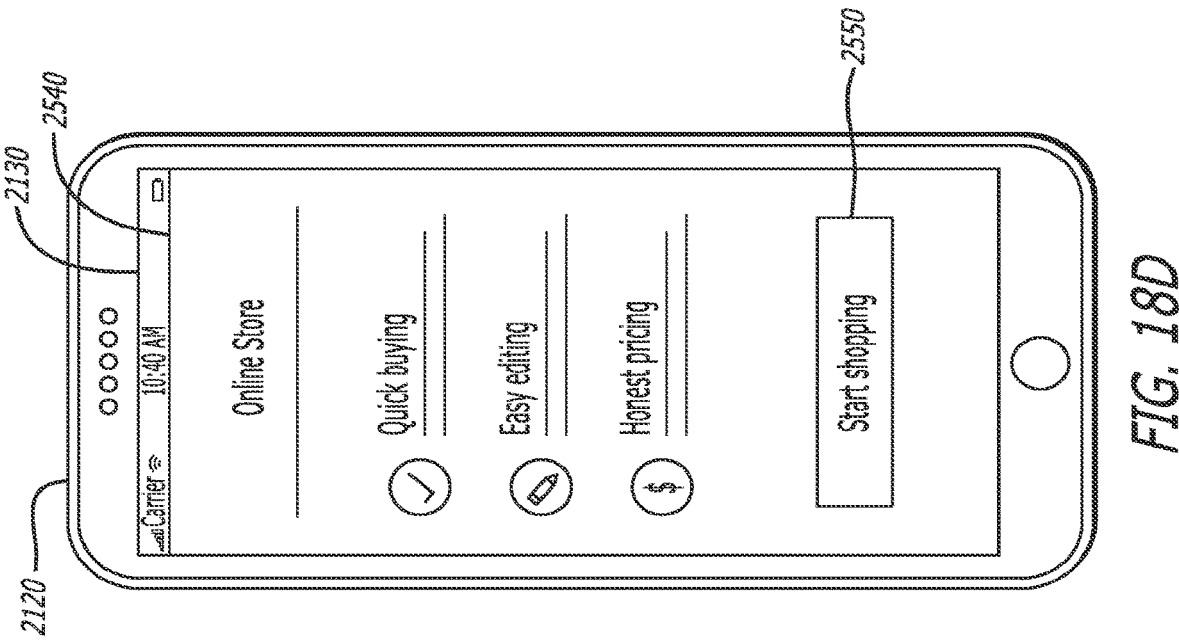
Figure 18C:
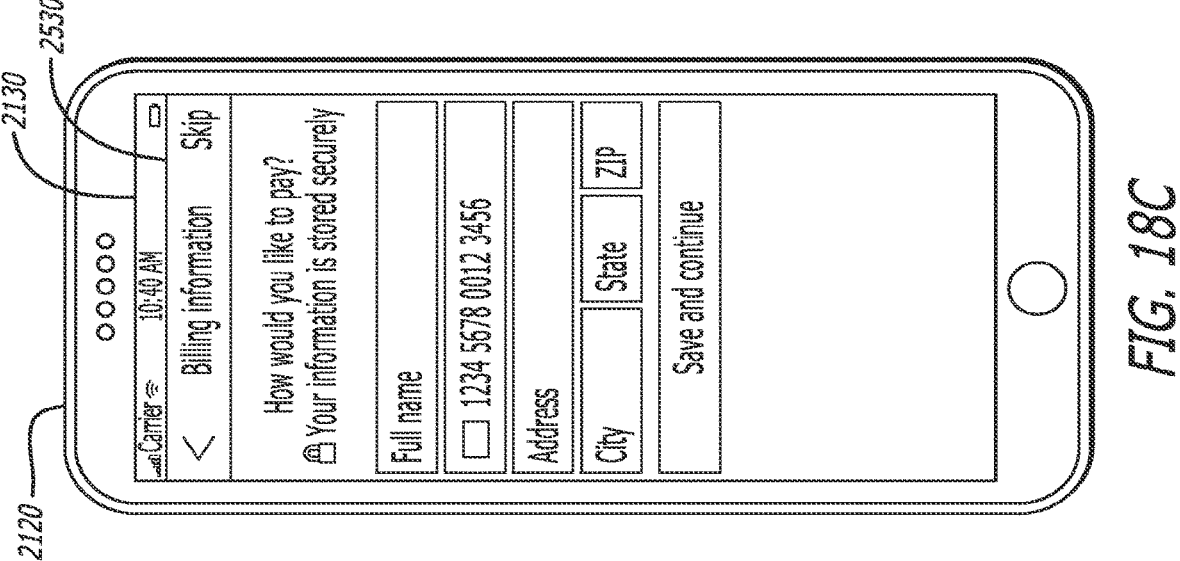

In an alternate embodiment, rather than waiting for a user to select to "buy" a product before determining if the user is logged in and completed the onboard process, upon detection of a user browsing a web page or navigating through an application where the user has not logged in or is logged in but not all of the required information has been entered in to the system, the quick transaction system is configured to generate and display interfaces, such as interfaces 2510, 2520, 2530 shown in FIGS. 18A-18C, that include requests for the consumer's information that is required to complete a transaction (e.g., email address, shipping address, billing information).

As shown in FIG. 18D, regarding the "quick buying" aspect of the system, the quick transaction system informs the user, such as through a user interface 2540, that a transaction is completed instantly with saved payment information after the "Buy" button is selected. Similarly, regarding the "Easy editing" aspect of the system, as shown in FIG. 18D the quick transaction system informs the user that he/she can change any parameter of his/her purchase, even after he/she purchases items. Further, as also shown in FIG. 18D regarding the "Honest pricing" aspect of the system, the quick transaction system informs the user that the system provides all-inclusive pricing so that the consumer knows the exact price they will pay for an item, inclusive of shipping, tax, etc. Finally, as shown in FIG. 18D, the displayed interface includes a "Start Shopping" button/icon 2550, which once selected by the user allows for instant processing and instant checkout with one tap buying based on saved onboarded information.

As shown in FIG. 19, the quick transaction system may be provided on a client-server system 2600. For example, the quick transaction system may be provided on an application on a user's electronic device 2610, where the quick transaction application connects to sales websites or online stores through the server 2620 of a seller or retailer over a network 2640. Alternately, the quick transaction application may connect to a third party, which then transmits the transaction to the seller or retailer. A separate server based website 2630 may also be provided. The separate server based website 2630 may be configured to provide the same quick transaction system features to registered users as the computing device based quick transaction application. For example, a user may log in directly to the quick transaction system website 2630 and purchase products without loading them in a shopping cart.

As shown in FIG. 20, the quick transaction system may be an application program interface (API) 2700 that interacts with one or more systems involved in an electronic or online purchase transaction. For example, the API 2700 is configured to interface with a retailer system 2710, with the user through a Client device and/or application 2720. The API 2700 may further interface with one or more databases 2730, such as a Client Info database 2730 that may provide client information, which includes saved payment information.

Figure 21:
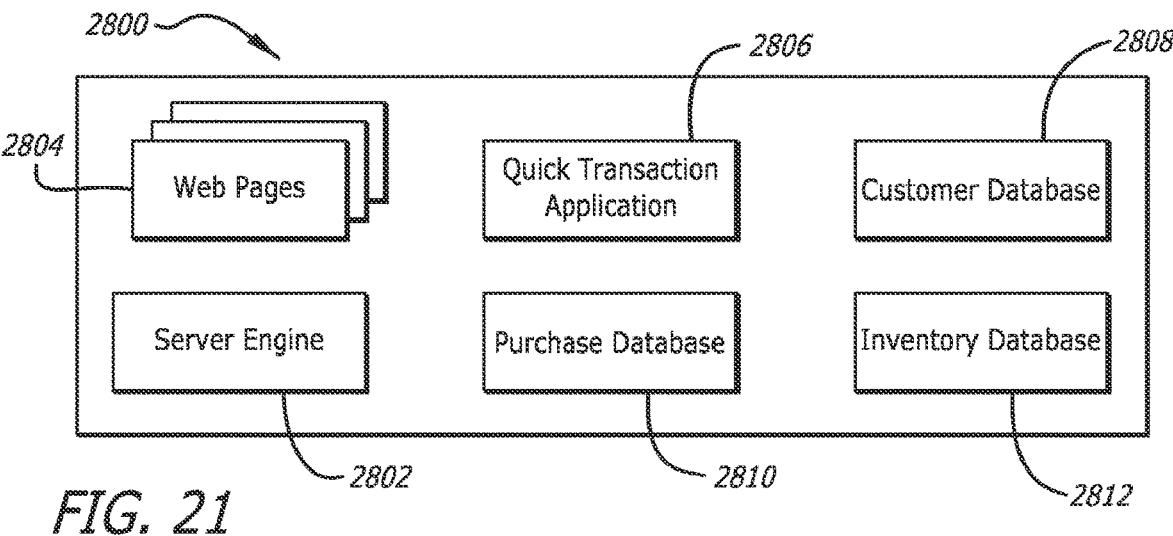
FIG. 21 is a schematic diagram illustrating a conceptual partial view of an example computer program product.

Referring to FIG. 21, a block diagram illustrating components of the server of FIG. 20 is provided. As shown, server 2800 includes a server engine 2802, various Web pages 2804, a quick transaction application 2806, a customer database 2808, a purchase database 2810, and an inventory database 2812. The server engine 2802 is configured to receive HTTP requests to access Web pages identified by URLs and provides the Web pages to the various client systems. The customer database 2808 contains customer information for various purchasers or potential purchasers. As stated, the customer information includes purchaser-specific order information such as the name of the customer, billing information, and shipping information. The purchase database 2810 contains an entry for each purchase that has not yet been shipped to a purchaser. The inventory database 2812 contains a description of the various items that may be ordered. Alternately, a plurality of servers 2800 having one or more of the components identified above may be utilized, and the various servers 2800 and/or components of the various servers 2800 will be in communication.

In accordance with the present disclosure, the quick transaction system may be an application program interface (API) that interacts with one or more systems involved in an electronic or online purchase transaction. For example, the API may interface with a retailer system through a Retailer Control Panel and through a Retailer backend system. The API may also interface with the user through a Client device and/or application.

Figure 22:
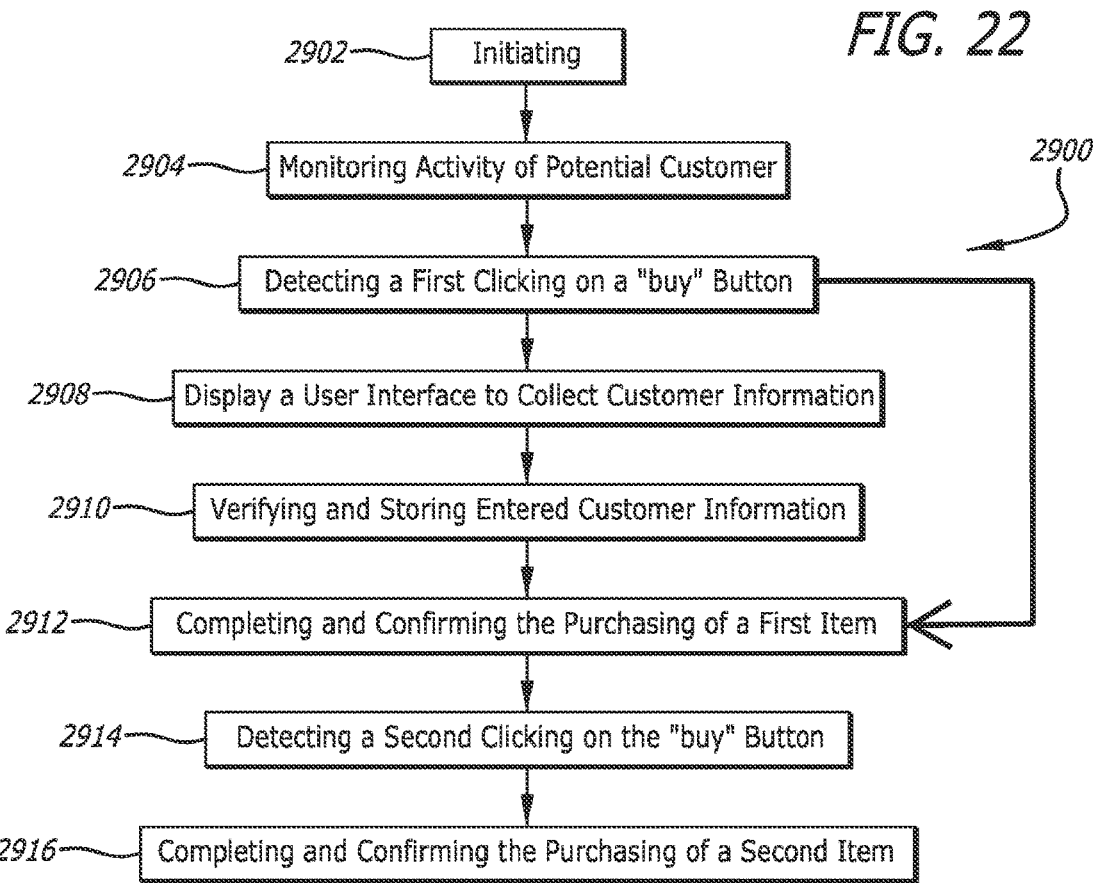
FIG. 22 is a flow chart of an exemplary process for electronically purchasing items without using a shopping cart.

Now referring to FIG. 22, a flow chart of the process 2900 for quick transaction/cartless purchasing of items accessed on a web page or application is shown. Once initiated, at Step 2902, by a purchaser accessing an item website of a vendor or a vendor application, the quick transaction system is configured to monitor the user access and browsing of the associated web pages and application screens, at Step 2904. Upon detection a clicking or otherwise selecting the "buy" button/icon by the customer to purchase a first item, at Step 2906, if the user is not logged in to the system or if not all of the required information for the particular user has been previously entered into the system, the quick transaction system is configured to trigger a user interface requesting the customer's information, at Step 2908.

For example, the user may be queried for basic information such as the user's name, address, email address, mobile phone number, communications preferences, billing information, and billing preferences. With regards to communications preferences, a user may select, for example, to receive order confirmations by email, text message, or robo-call. With regards to billing preferences, a user may select, for example, to charge one credit card for certain types of expenses, such as clothing, and another credit card for other expenses, such as office supplies. Other payment forms may also be entered (e.g., online wallet, bit coin address, a gift card and the like). Further, the user may set up rules that allow for "lowest cost routing" of payment. For example, the user may have three credit cards, one that provides better rates for transactions in excess of $100, one that provides better rates for purchases of electronic goods, and one that is designated for purchases made on behalf of the user's employer.

Subsequently, once the user completes his/her entry of the requested information, the quick transaction system is configured to verify and store the customer's information, at Step 2910. Moreover, upon verification of the customers' information, the quick transaction system is configured to complete the purchasing process of the first item, which may include the purchase of a multitude of the first item, at Step 2912. If however, the consumer is logged in and has previously entered all of the requested customer information, after selecting the "Buy" button/icon in Step 2906, the system will proceed directly to Step 2912 to complete the purchase transaction.

As the user continues to seek additional items to purchase, the quick transaction system retains the customer's information for the next detection of selecting the "Buy" button/icon by the same purchaser. As such, once the quick transaction system detects the next selection of the "Buy" button/icon by the purchaser who intends to purchase a second item, at Step 2914, the quick transaction system is configured to automatically display a user interface to complete the purchasing of the second item, without requesting any customer information, and provide a purchasing confirmation to the customer, at Step 2916.

As stated above, each purchased item has a separate purchasing transaction associated with it, and the customer's information is requested only for the first purchasing transaction, and only then if the customer is not already logged in. The quick transaction system is also configured to generate and display another user interface, after the purchase of the second item, for example, to inform the purchaser whether the first purchased item(s) and the second purchased item(s) may be shipped together on the same day or on different days based on their respective inventories. Additionally, on the back end of the quick transaction system, retailers are able to define grouping windows for batching of transactions to provide a benefit to both the retailer and the consumer.

In various embodiments, as explained above, the system allows for unbuying and/or modifying previously processed orders. Additionally, the system may also allow in certain embodiments for various promotions or benefits to the user post processing, including, but not limited to, the batching of certain orders for shipping, and promotions based on spend thresholds.

In one embodiment, immediately upon the user selecting to "buy" a product, the system processes the order. Once the order is processed, in one embodiment an electronic receipt or confirmation is provided to the user, signifying that the order is completed, and the system locks the order. Additionally, at that time the system may create one or more different thresholds, including but not limited to an (1) edit time value, a (2) batch duration time, which is also referred to as the order cutoff time; and (3) free shipping qualification based on certain thresholds. In one embodiment, the edit time value is a period of time set by the retailer/seller within which the user may modify or unbuy their order following the completion of the order. Typically, the edit time is configured by the retailer/seller as part of their system configuration. For example, if the seller sets the edit time at 2 hours, when a buyer makes a purchase at 4:15, the buyer has until 6:15 to either unbuy or modify that order. After 6:15, in this example, the order is marked as unchangeable and the buyer/user can no longer make changes through the system to that order.

Similarly, in one embodiment, a batch relates to orders that are designated to be shipped to the same address and which are placed within a certain window of time, or before a certain deadline, both of which are defined by the seller/retailer, so that they can be passed to fulfillment together. Doing so helps the user/buyer not have to repeatedly pay separate shipping for items purchased within a buying session, and it also allows for logistical efficiencies for the retailer. Like the edit time value, the batch duration time is a period of time set by the retailer/seller within which all orders by a user that are designated to be shipped to the same address can be shipped together. Alternately, the batch duration time may be a deadline whereby all orders by a user that are designated to be shipped to the same address can be shipped together. For example, if the batch duration time is set at 3 hours, and the buyer makes a purchase at 4:15, all subsequent orders of the buyer that are designated to be shipped to the same address and which are completed prior to 7:15 will be batched together and the buyer will typically receive a reduced shipping rate for all batched purchases. As an alternate example, the seller/retailer may set a given time of day, such as 5:00 pm, as a batch deadline, whereby all orders made from the prior day at 5:01 pm until the present day at 5:00 pm, and which are designated to be shipped to the same address, will be batched together for shipment purposes. In such an embodiment, the batch would contain all completed purchases for the same address into a shipment so that it can be passed to the fulfillment system for processing at the same time every day, which in this example is 5:00 pm. Once a user buys an item, the system reminds the buyer about the time they have left to add to their order for reduced or no additional shipping cost.

Further, in one embodiment the system allows the retailer/seller to offer free shipping to the user based on certain requirements, such as attaining a threshold for dollars spent or items purchased in a session. For example, in one embodiment, the system will prompt the user after their make their first purchase about the additional money they need to spend, i.e. the 'spend threshold', within a time threshold determined by the retailer, to qualify for free shipping. Once the user hits the spend threshold within the time threshold, the shipping costs the user was charged when purchasing their prior item(s) will be reversed. Similarly, once a user buys an item, the system reminds the buyer about the time they have left to add to their order for reduced or no additional shipping cost.

In various embodiments, the system provides indicators on the various displays viewed by the user, e.g., website pages or application screens, of the time needed to qualify additional purchases for reduced shipping, the time/amount needed to qualify additional or all purchases for free shipping, or the time allowed and/or remaining for unbuying or editing an order.

Below are two examples of buying scenarios under the disclosed system:

Example 1: Retailer threshold configuration: Edit time is 2 hours, free shipping qualification is $50, and batch duration time is 3 hours.

Buyer X logs into the system, an application on her smartphone, to make purchases. At 2:45 pm, Buyer X views Wrinkle Cream and is shown a price of $29.99, which is inclusive of shipping and tax. Buyer X selects "buy." The system knows: (1) Buyer X has 2 hours to change anything about this order, (2) if Buyer X spends $50 total in over two hours she will qualify for free shipping, and (3) anything Buyer X orders in the next 3 hours could go in the same box, and she can receive reduced shipping costs.

At 2:47 pm, after her first purchase, Buyer X views a new product list. The footer on the screen states "spend $20.01 more by 5:45 to get free shipping on your Wrinkle Cream." As identified, the system will calculate the difference in spend that will allow the user to earn free shipping.

At 2:53 pm, Buyer X buys an Insulated Family Cooler in Cali Stripes. Buyer X is charged the price of the item as well as tax. Buyer X is NOT charged for shipping because she has hit the threshold for $50 within the two hour window.

At 3:43 pm, Buyer X changes her mind about the Insulated Family Cooler and modifies it to the Emma Pink version since she is within the 2 hour edit time window.

At 4:45 pm, the initial order is marked as unchangeable and batching countdown starts. At 4:53 pm, the second order is marked as unchangeable and another batching countdown starts. Buyer X then sets her smartphone down for a while.

At 5:40 pm, Buyer X turns her smartphone back on and gets back into the application. The footer on the home view states "FREE SHIPPING ON ALL ORDERS PLACED UNTIL 5:45 pm." At 5:44 pm, Buyer X buys Bug Spray. Buyer X is charged the price of the item as well as tax. Buyer X is NOT charged for shipping because she is still inside of the batching window of her first purchase.

At 5:46 pm, Buyer X views the 'home' product list on the application. All prices are now inclusive of the cost of shipping and the footer now shows "PRICES INCLUDE TAXES AND SHIPPING". At 5:47 pm, Buyer X buys a Wine Glass, and is charged the price of the item as well as the price of shipping and tax. The system knows: (1) Buyer X has 2 hours to change anything about this order, (2) if she spends $50 total in over two hours, she will qualify for free shipping, (3) anything she orders in the next 3 hours could go in the same box, and we can save the user on shipping costs.

At 7:44 pm, the third order is marked as unchangeable and another batching countdown starts.

At 7:45 pm, the first order batching countdown ends. The system checks for all of the orders that are unchangeable that could be batched together; it finds the first, second and third orders and puts them together into a shipment. That shipment is sent to the identified shipping address. The process will also invalidate the countdowns associated with any of the items in the shipment.

Example 2: Retailer threshold configuration: Edit time to 2 hours, and order cutoff time is 5 pm.

Buyer X logs into the system, an application on her smartphone, to make purchases. At 2:45 pm, Buyer X views Wrinkle Cream and is shown a price of $29.99, which is inclusive of shipping and tax. Buyer X selects "buy." The system knows: (1) Buyer X has 2 hours to change anything about this order, (2) anything Buyer X orders until 5 pm could go in the same box, and she can save shipping costs.

At 2:47 pm, after her first purchase, Buyer X views a new product list. The footer on the screen states "REDUCED SHIPPING COSTS ON ALL ORDERS PLACED UNTIL 5:00 pm."

At 2:53 pm, Buyer X buys an Insulated Family Cooler in Cali Stripes. Buyer X is charged the price of the item, tax, as well as the incremental cost of shipping. She is ONLY charged for the incremental cost of shipping because she has made the second order before the batching cutoff time (5 pm) of the day.

At 3:43 pm, Buyer X changes her mind about the Insulated Family Cooler and modifies it to the Emma Pink version since she is within the 2 hour edit time window.

At 4:45 pm, the initial order is marked as unchangeable and batching countdown starts. At 4:53 pm, the second order is marked as unchangeable and another batching countdown starts. Buyer X then sets her smartphone down for a while.

At 4:56 pm, Buyer X turns her smartphone back on and gets back into the application. The footer on the home view states "REDUCED SHIPPING COSTS ON ALL ORDERS PLACED UNTIL 5:00 pm." At 4:57 pm, Buyer X buys Bug Spray. Buyer X is charged the price of the item, tax, as well as the incremental cost of shipping. She is ONLY charged for the incremental cost of shipping because she is before the batching cutoff time (5 pm) of the day.

At 5:06 pm, Buyer X views the 'home' product list on the application. All of the prices are now inclusive of the cost of shipping, the footer now shows "PRICES INCLUDE TAXES AND SHIPPING". At 5:47 pm, Buyer X buys a Wine Glass, and is charged the price of the item as well as the price of shipping and tax. The system knows: (1) Buyer X has 2 hours to change anything about this order, (2) anything she orders in the next 23 hours (until 5 pm the following day) could go in the same box, and we can save the user on shipping costs.

At 6:56 pm, the third order is marked as unchangeable.

At 7:00 μm, the daily order batching cutoff occurs. This occurs a full edit time after the configured order cutoff time. The system checks for all of the orders that are unchangeable that could be batched together; it finds the first three orders and puts them into a shipment. That shipment is sent to fulfillment.

At 7:47 pm, the fourth order is marked as unchangeable.

At 7:00 pm (next day), order batching cutoff occurs. The system checks for all of the orders that are unchangeable that could be batched together; it finds the forth order only, and puts it into a shipment. That shipment is sent to fulfillment.

Days later Buyer X receives two shipments, staggered by a day. The first containing her first three orders, the second (which arrive a day later) containing her fourth.

In some examples, the discussed application may be implemented as computer program instructions encoded on a computer-readable storage media in a machine-readable format. FIG. 23 is a schematic diagram illustrating a conceptual partial view of an example computer program product 3000 that includes a computer program for executing a computer process on a computing device, arranged according to at least some examples presented herein. The example computer program product 3000 may be provided using a non-transitory computer readable medium 3001. The non-transitory computer readable medium 3001 may include one or more programming instructions 3002 that, when executed by one or more processors may provide functionality or portions of the functionality described above with respect to FIGS. 14A-22. Thus, for example, referring to the example shown in FIG. 22, one or more features of blocks 2902, 2904, 2906, 2908, 2910, 2912, 2914, and/or 2916 may be undertaken by one or more instructions associated with the non-transitory computer readable medium 3001.

In some implementations, the non-transitory computer readable medium 3001 may encompass a computer recordable medium 3003, such as, but not limited to, memory, read/write (R/W) CDs, R/W DVDs, etc. The one or more programming instructions 3002 may be, for example, computer executable and/or logic implemented instructions.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM chips, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as computing devices, which include mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, and flash memory. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

Aspects of the subject technology described in this specification can be implemented in a computing system that includes a retailer server, which includes the above-discussed application and client info database, and a client computer having a graphical user interface or a web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The client computer and retailer server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps m the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system associated with a service provider, comprising:

a non-transitory memory; and one or more hardware processors coupled to the non-transitory memory and configured to read instructions from the non-transitory memory to cause the system to perform operations comprising:

detecting that a first webpage operated by a first seller and hosted by a first server associated with the first seller is accessed by a user device, wherein the first seller is different from the service provider, and wherein the first webpage comprises a first presentation of a first product offered for sale by the first seller and a first buy selector associated with the first product;

subsequent to the detecting, determining a second product offered for sale on a second webpage operated by a second seller and hosted by a second server associated with the second seller based on querying a composite product catalog using at least the first product, wherein the composite product catalog comprises product information associated with a plurality of products offered for sale by a plurality of sellers;

modifying, using an application programming interface (API) associated with the first seller, the first webpage by inserting, into the first webpage, a second presentation of the second product offered for sale on the second webpage operated by the second seller and a second buy selector associated with the second product, wherein the second presentation of the second product and the first presentation of the first product are organized according to one or more organizational formats associated with the first webpage;

presenting the modified first webpage on the user device;

in response to receiving an indication of a selection of the second buy selector via the modified first webpage, generating a purchase transaction request for purchasing the second product from the second seller without redirecting the user device away from the modified first webpage associated with the first seller;

determining that no changes to the purchase transaction request were made by a user of the user device during a period of time subsequent to the receiving the indication;

in response to determining that the period of time has passed and that no changes to the purchase transaction request were made by the user during the period of time, transmitting the purchase transaction request to the second server;

determining that additional user information is required by the second seller to complete a purchase transaction associated with the purchase transaction request; and transmitting the additional user information to the second server.

2. The system of claim 1, wherein the operations further comprise:

providing, on the modified first webpage, an edit selector for editing the purchase transaction; and providing, on the modified first webpage, a countdown of a time remaining for editing the purchase transaction request based on the period of time.

3. The system of claim 1, wherein the operations further comprise:

detecting a selection of the first buy selector via the modified first webpage;

generating, based on the selection of the first buy selector, a second purchase transaction request for purchasing the first product from the first seller; and providing, on the modified first webpage, a countdown of a time remaining for editing the second purchase transaction request based on the period of time.

4. The system of claim 1, wherein the first buy selector and the second buy selector share a same appearance.

5. The system of claim 1, wherein the second product is determined further based on the second product not being available for sale by the first seller.

6. The system of claim 1, wherein the operations further comprise:

providing, on the modified first webpage, a prompt for the user of the user device to log in to a transaction system prior to receiving the indication.

7. The system of claim 1, wherein the operations further comprise:

retrieving the additional user information from a user profile associated with the user of the user device.

8. A method, comprising:

detecting, by a service provider server, that a first webpage operated by a first seller and hosted by a first server associated with the first seller is accessed by a user device;

analyzing, by the service provider server, a first presentation of a first product included in the first webpage, wherein the first product is offered for sale by the first seller via the first webpage, and wherein the first presentation includes a first buy selector for purchasing the first product via the first webpage;

subsequent to the detecting, determining, by the service provider server, a second product offered for sale on a second webpage operated by a second seller and hosted by a second server associated with the second seller based on at least the first product;

modifying the first webpage based on the second product, wherein the modifying comprises inserting, into the first webpage, a second presentation of the second product offered for sale on the second webpage operated by the second seller and hosted by the second server, wherein the second presentation comprises a second buy selector for purchasing the second product via the first webpage, and wherein the second presentation of the second product and the first presentation of the first product are organized according to one or more organizational formats associated with the first webpage;

in response to receiving an indication of a selection of the second buy selector via the modified first webpage, generating, by the service provider server, a purchase transaction for purchasing the second product from the second seller without redirecting the user device away from the modified first webpage associated with the first seller;

determining, by the service provider server, that additional user information is required by the second seller to complete the purchase transaction; and in response to determining that a period of time subsequent to the receiving the indication has passed and that no changes to the purchase transaction were made by a user of the user device during the period of time, processing, by the service provider server, the purchase transaction based on communicating transaction data associated with the purchase transaction and the additional user information to the second server.

9. The method of claim 8, further comprising:

monitoring one or more purchase transactions conducted through a user account associated with a user of the user device, wherein the second product is determined further based on the monitoring.

10. The method of claim 9, further comprising:

deriving a shopping habit associated with the user based on one or more past transactions conducted through the user account, wherein the second product is determined further based on the shopping habit associated with the user.

11. The method of claim 8, further comprising:

determining a plurality of products offered for sale on a plurality of webpages operated by a plurality of sellers based on at least one of the first product or a user profile associated with the user of the user device; and filtering out, from the plurality of products, one or more products offered for sale by the first seller.

12. The method of claim 8, wherein the second product is determined further based on a historic purchase pattern of the second product associated with the user of the user device.

13. The method of claim 8, further comprising:

prior to the modifying the first webpage, providing, on the first webpage, a prompt for the user of the user device to log in to a transaction system in response to determining that the user is not logged in to the transaction system; and determining a user profile of the user, wherein the second product is determined further based on the user profile.

14. The method of claim 8, further comprising:

providing, on the modified first webpage, an interface that prompts the user of the user device for the additional user information.

15. A non-transitory machine-readable medium having stored thereon machine-readable instructions executable to cause a machine associated with a service provider to perform operations comprising:

detecting that a first webpage operated by a first seller and hosted by a first server associated with the first seller is accessed by a user device, wherein the first seller is different from the service provider, and wherein the first webpage comprises a first presentation of a first product offered for sale by the first seller and a first buy selector associated with the first product;

querying a composite product catalog using at least the first product, wherein the composite product catalog comprises product information associated with a plurality of products offered for sale on a plurality of webpages operated by a plurality of sellers;

based on the querying, determining a second product offered for sale on a second webpage operated by a second seller and hosted by a second server associated with the second seller;

modifying, using an application programming interface (API) associated with the first seller, the first webpage, wherein the modifying comprises inserting, into the first webpage, a second presentation of the second product offered for sale on the second webpage operated by the second seller and a second buy selector associated with the second product, and wherein the second presentation of the second product and the first presentation of the first product are organized according to one or more organizational formats associated with the first webpage;

receiving an indication of a selection of the second buy selector via the modified first webpage;

generating, based on the selection of the second buy selector, a first purchase transaction for purchasing the second product from the second seller without redirecting the user device away from the modified first webpage associated with the first seller;

detecting a selection of the first buy selector via the modified first webpage;

generating, based on the selection of the first buy selector, a second purchase transaction request for purchasing the first product from the first seller;

subsequent to the generating the second purchase transaction, providing, on the modified first webpage, a countdown of a time remaining for editing the second purchase transaction based on a period of time;

monitoring any changes to the second purchase transaction made by a user of the user device for the period of time; and in response to determining that the period of time has passed and that no changes to the second purchase transaction were made by the user during the period of time, transmitting transaction data associated with the first purchase transaction to the second server.

16. The non-transitory machine-readable medium of claim 15, wherein the operations further comprise:

monitoring one or more purchase transactions conducted through a user account associated with the user of the user device, wherein the second product is determined further based on the one or more purchase transactions.

17. The non-transitory machine-readable medium of claim 15, wherein the operations further comprise:

determining a set of products offered for sale on the plurality of webpages operated by the plurality of sellers based on at least the first product; and filtering out, from the set of products, one or more products offered for sale by the first seller.

18. The non-transitory machine-readable medium of claim 15, wherein the second product is determined further based on a historic purchase pattern of the second product associated with the user of the user device.

19. The non-transitory machine-readable medium of claim 15, wherein the operations further comprise:

prior to the modifying the first webpage, providing, on the first webpage, a prompt for the user of the user device to log in to a transaction system in response to determining that the user is not logged in to the transaction system; and determining a user profile of the user, wherein the second product is determined further based on the user profile.

20. The non-transitory machine-readable medium of claim 15, wherein the operations further comprise:

determining that additional user information is required by the second seller to complete the purchase transaction; and transmitting the additional user information retrieved from a user profile associated with the user of the user device to the second seller.

* * * * *